United States Patent [19]

Itoh

[11] Patent Number: 5,376,981
[45] Date of Patent: Dec. 27, 1994

[54] DATA RECORDING APPARATUS FOR A CAMERA

[75] Inventor: Junichi Itoh, Tokyo, Japan

[73] Assignee: Olympus Optical Co., Ltd., Tokyo, Japan

[21] Appl. No.: 84,898

[22] Filed: Jun. 29, 1993

[30] Foreign Application Priority Data

Jul. 3, 1992 [JP] Japan .................... 4-176906

[51] Int. Cl.⁵ .............. G03B 17/24; G03B 17/18; G03B 29/00
[52] U.S. Cl. ...................... 354/106; 354/475; 354/76; 354/289.1
[58] Field of Search ............... 354/471–475, 354/105, 106, 75, 76, 289.1

[56] References Cited

U.S. PATENT DOCUMENTS

| 4,853,733 | 8/1989 | Watanabe et al. | 354/105 X |
| 4,973,996 | 11/1990 | Harvey | 354/106 |
| 5,130,728 | 7/1992 | Goto et al. | 354/105 |
| 5,184,161 | 2/1993 | Egawa | 354/105 |
| 5,194,892 | 3/1993 | Robinson | 354/106 X |

FOREIGN PATENT DOCUMENTS 3-223737  10/1991  Japan .

Primary Examiner—Michael L. Gellner
Assistant Examiner—Jae N. Noh
Attorney, Agent, or Firm—Frishauf, Holtz, Goodman & Woodward

[57] ABSTRACT

A microcomputer (μCOM) in a camera causes an EEPROM in a memory unit to store data on each picture taken. The photographic data stored in the EEPROM is read by the μCOM and displayed on a display unit. According to the operation of an UP SW or a DOWN SW, the μCOM updates the contents stored in the EEPROM now being displayed. The photographic data stored in the EEPROM is written in a first magnetic track on the film by a first magnetic head arranged in a magnetic information control circuit, at the time of the rewinding of the film. In addition, when a film with which photography is already finished is loaded in the camera, the μCOM, while advancing the film, causes the first magnetic head to reproduce the data written in the first magnetic track on the film and stores the reproduced data in the EEPROM.

1 Claim, 22 Drawing Sheets

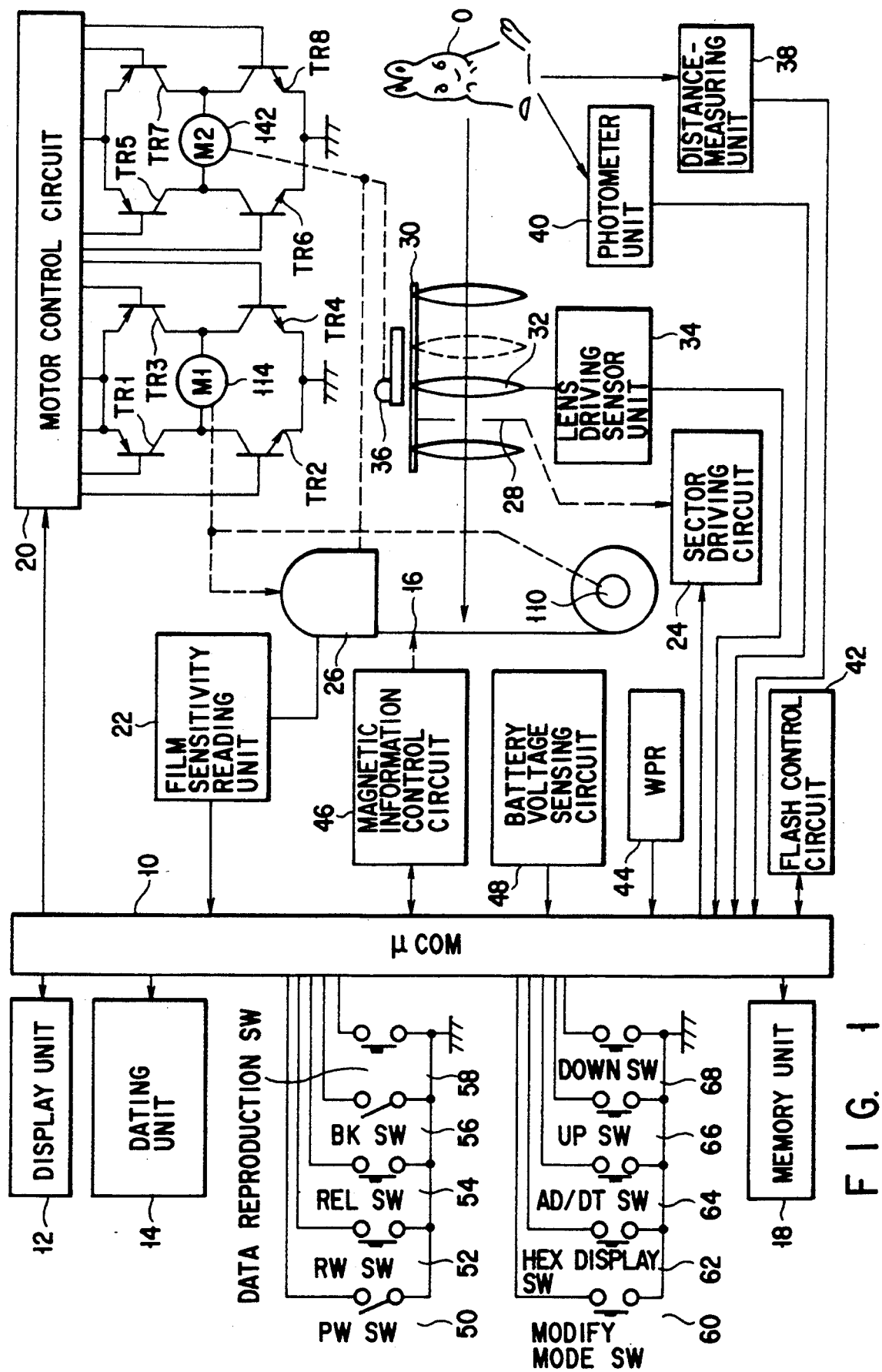
F I G. 1

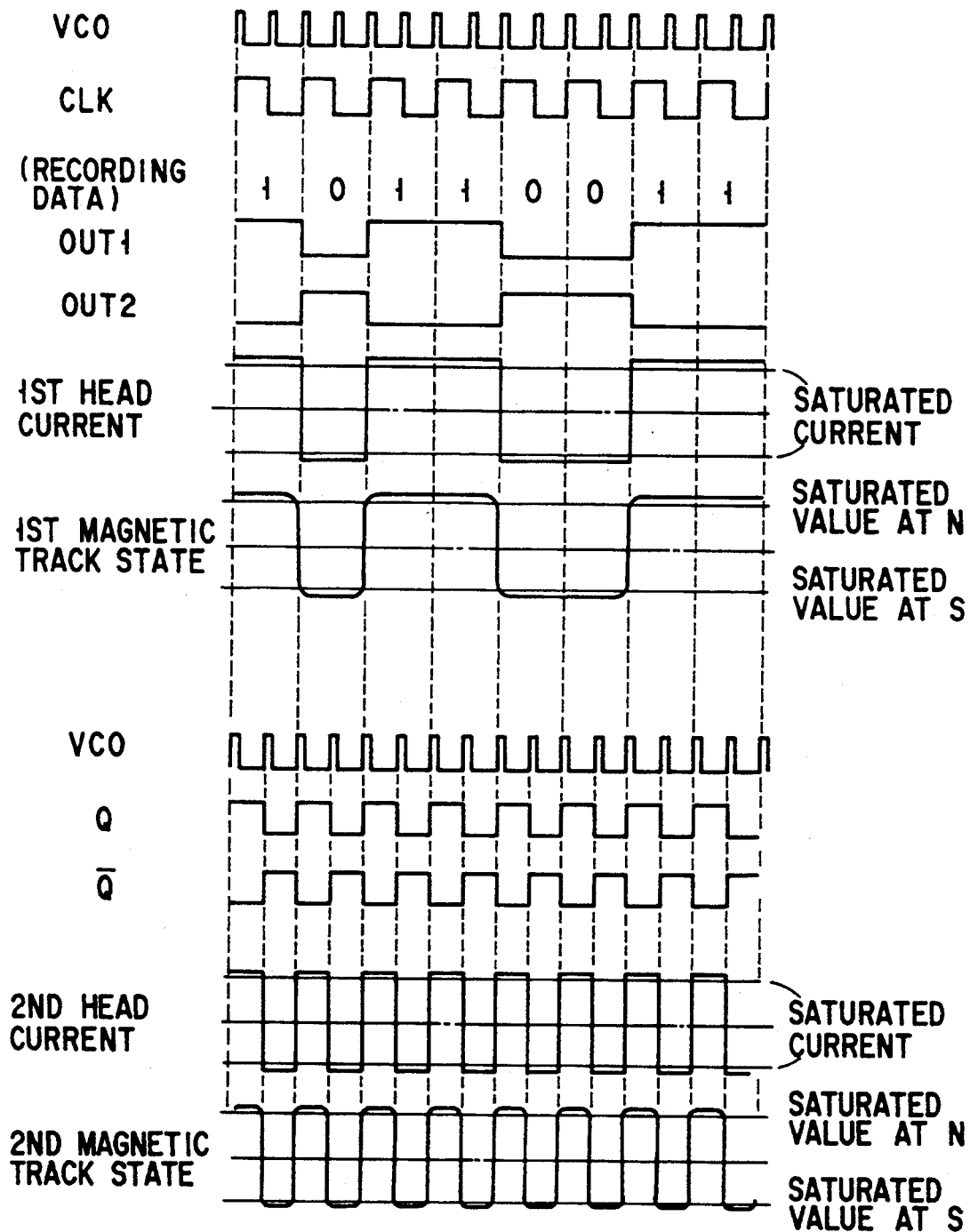
F I G. 3

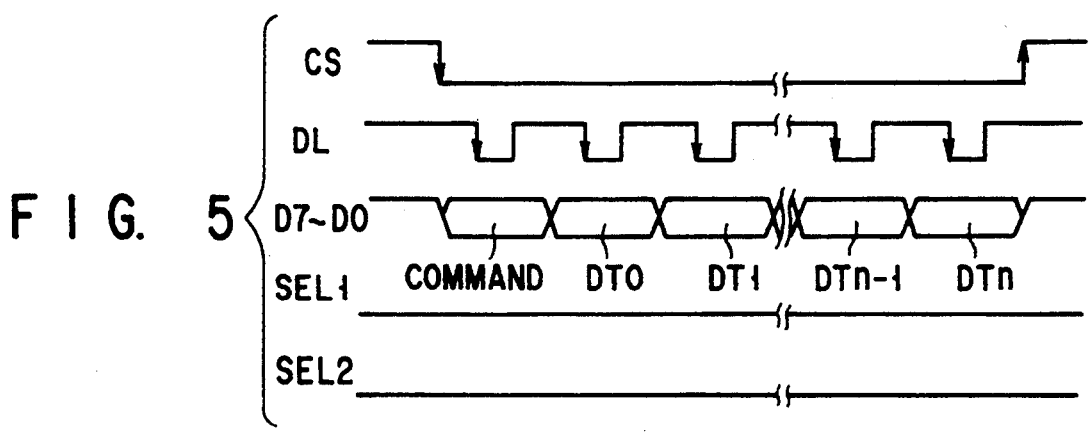
F I G. 5
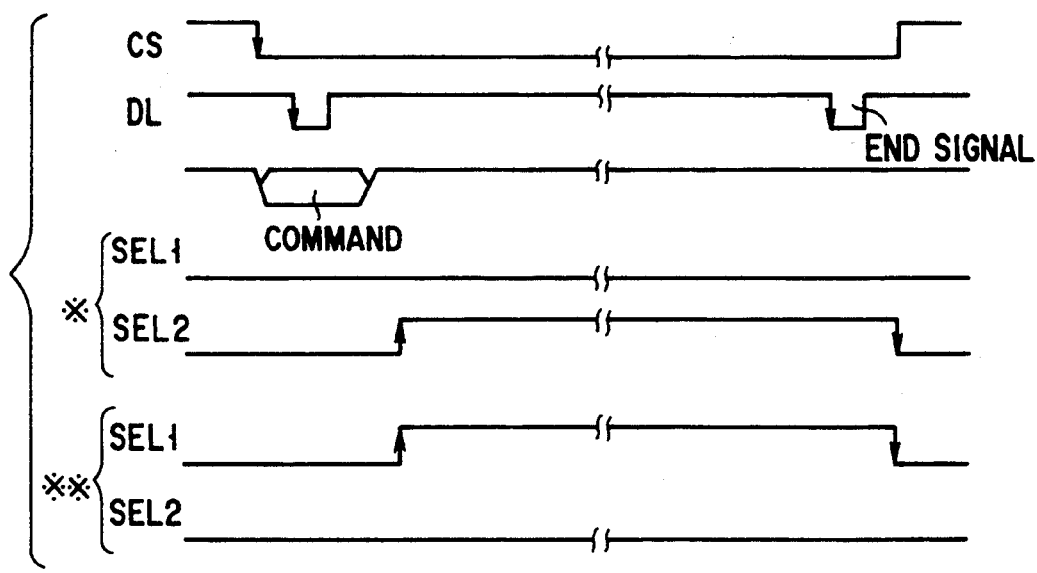
F I G. 6
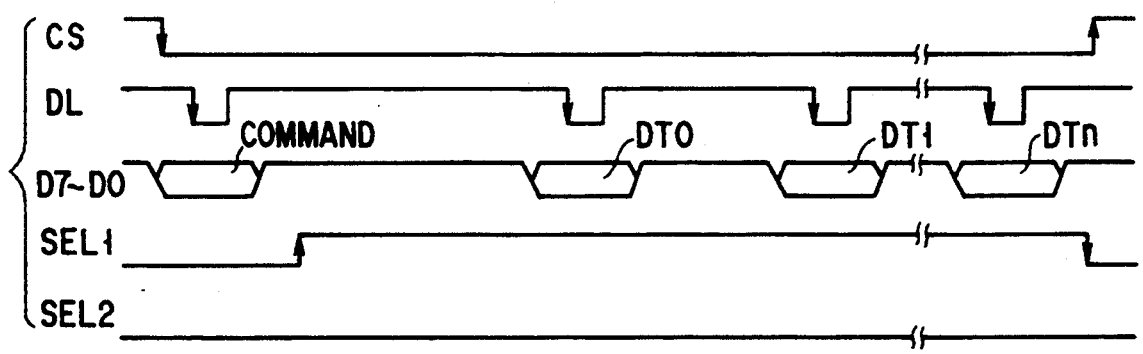
F I G. 7

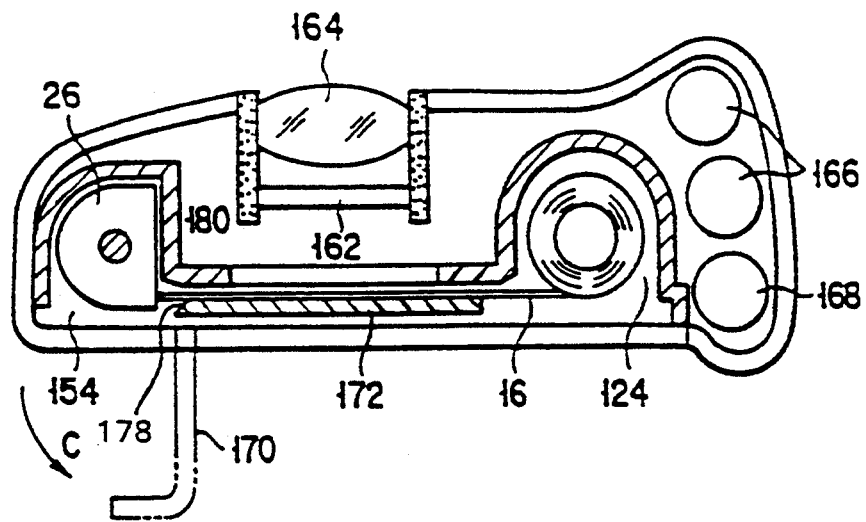
F I G. 13
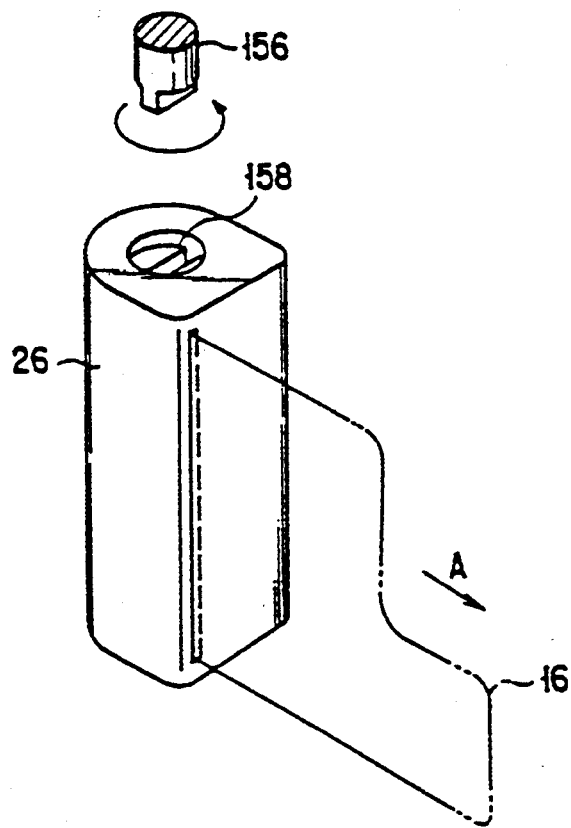
F I G. 14

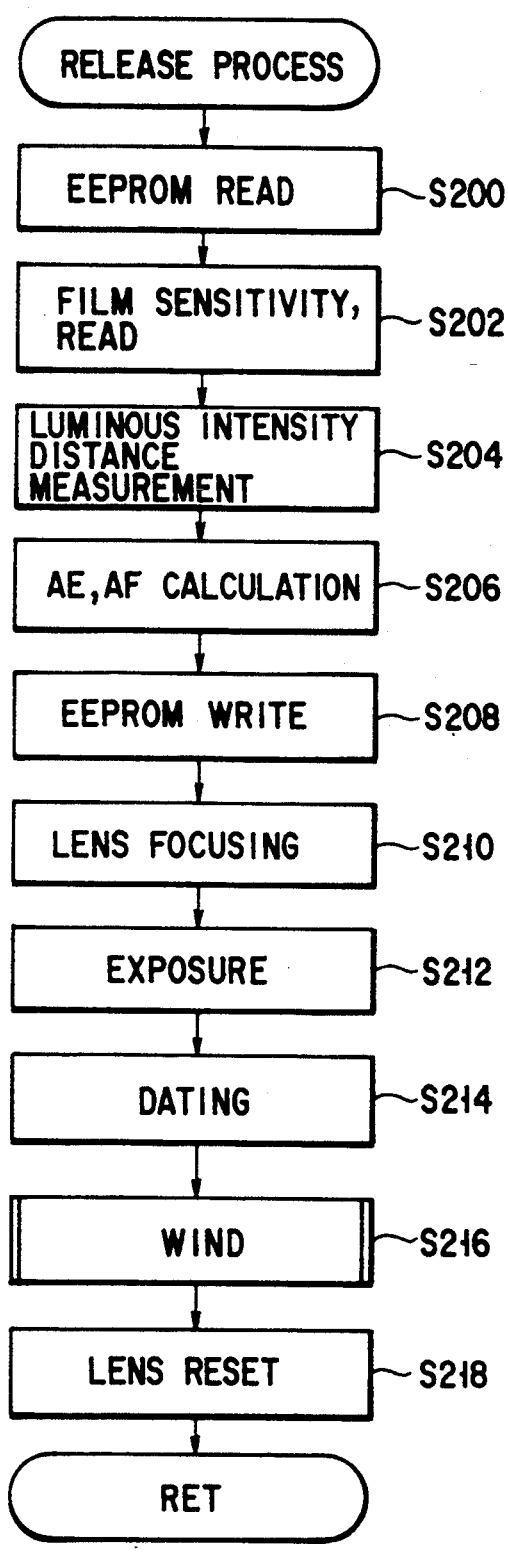
F I G. 17                F I G. 18

| NUMBER | DATA (HEX) | CHARACTER |
|---|---|---|
| 1 | 44 | D |
| 2 | 41 | A |
| 3 | 54 | T |
| 4 | 45 | E |
| 5 | 35 | 5 |
| 6 | 33 | 3 |
| 7 | 31 | 1 |
| 8 | 35 | 5 |
| 9 | 31 | 1 |
| 10 | 35 | 5 |
| 11 | 30 | 0 |
| 12 | 34 | 4 |
| 13 | 39 | 9 |
| 14 | 35 | 5 |
| ⸳ | ⸳ | ⸳ |
| N − 11 | FF |  |
| N − 10 | D4 (54) | T |
| N − 9 | D6 (56) | V |
| N − 8 | B7 (37) | 7 |
| N − 7 | C1 (41) | A |
| N − 6 | E5 (56) | V |
| N − 5 | B4 (34) | 4 |
| N − 4 | C5 (45) | E |
| N − 3 | D8 (58) | X |
| N − 2 | D0 (50) | P |
| N − 1 | B1 (31) | 1 |
| N | B9 (39) | 9 |

- 1–4: DATE
- 5–6: 53 (MINUTE)
- 7–8: 15 (HOUR)
- 9–10: 15 (DAY)
- 11–12: 04 (MONTH)
- 13–14: 95 (YEAR)
- N−11: ※
- N−10 to N−8: TV7 (1/125)
- N−7 to N−5: AV4 (FN04)
- N−4 to N: EXP 19 (19TH FRAME)

FIG. 19

ISO

| | 0 | 1 | 2 | 3 | 4 | 5 | 6 | 7 |
|---|---|---|---|---|---|---|---|---|
| 0 | NUL | TC7 (DLE) | SP | 0 | @ ★ | P | ★ | p |
| 1 | TC1 (SOH) | DC1 | ! | 1 | A | Q | a | q |
| 2 | TC2 (EXT) | DC2 | " | 2 | B | R | b | r |
| 3 | TC3 (EOT) | DC3 | £(#) ★ | 3 | C | S | c | s |
| 4 | TC4 (EOT) | DC4 | $(¤) ★ | 4 | D | T | d | t |
| 5 | TC5 (ENQ) | TC8 (NAK) | % | 5 | E | U | e | u |
| 6 | TC6 (ACK) | TC9 (SYN) | & | 6 | F | V | f | v |
| 7 | BEL | TC10 (ETB) | ' | 7 | G | W | g | w |
| 8 | FE0 (BS) | CAN | ( | 8 | H | X | h | x |
| 9 | FE1 (HT) | EM | ) | 9 | I | Y | i | y |
| A | FE2 (LF) | SUB | ∗ | : | J | Z | j | z |
| B | FE3 (VT) | ESC | + | ; | K | ★ | k | ★ |
| C | FE4 (FF) | IS4 (FS) | , | < | L | ★ | l | ★ |
| D | FE5 (CR) | IS3 (GS) | − | = | M | ★ | m | ★ |
| E | SO | IS2 (RS) | . | > | N | ^ ★ | n | ‾ ★ |
| F | S1 | IS1 (US) | / | ? | O | _ | o | DEL |

FIG. 20

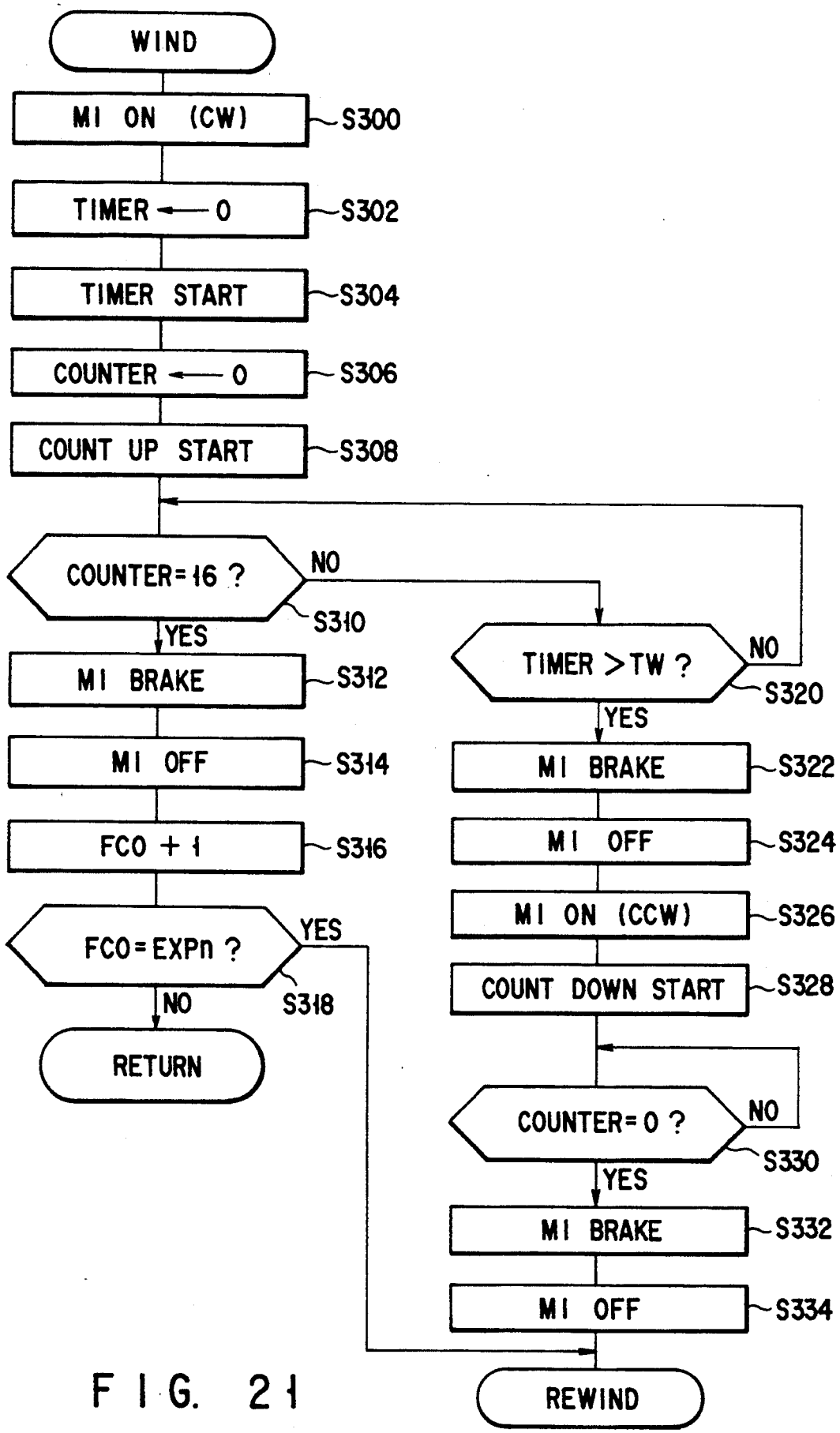
F I G. 2 1

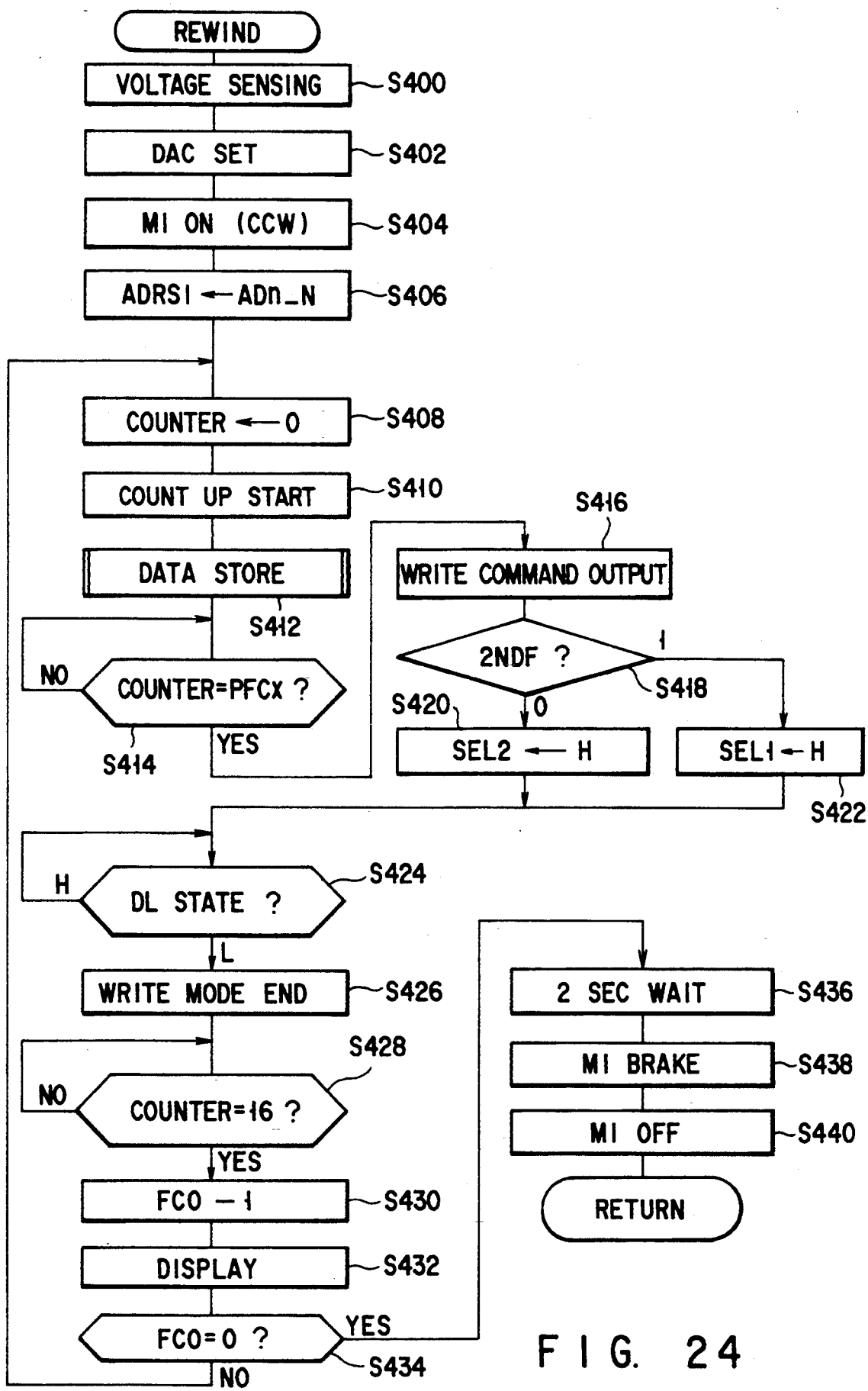
F I G. 24

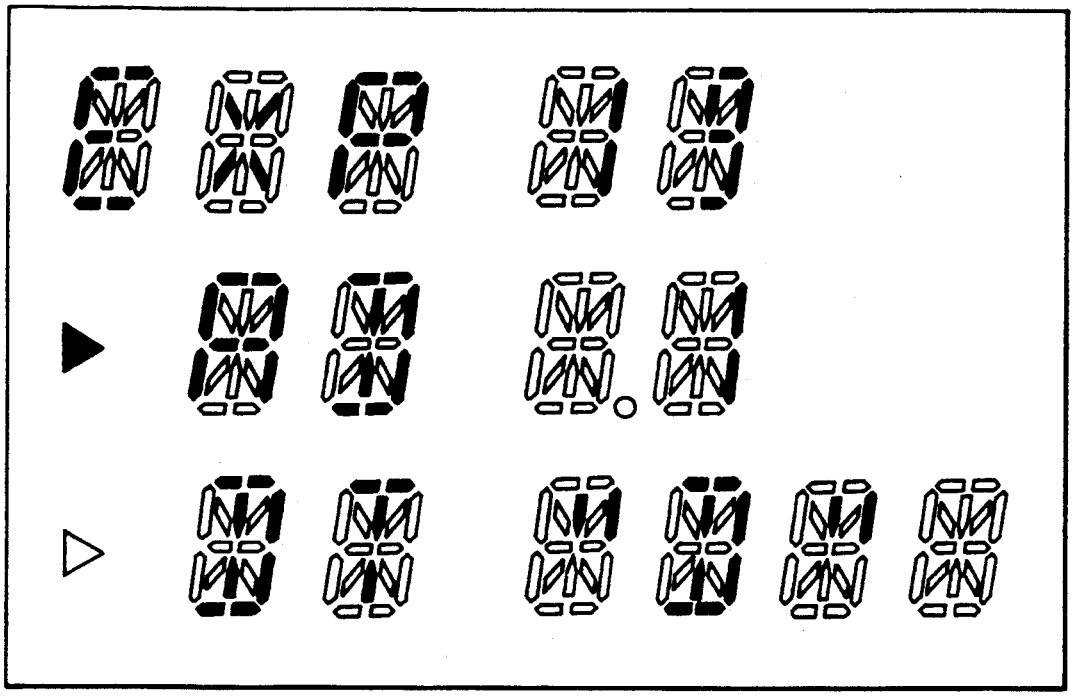
F I G. 29
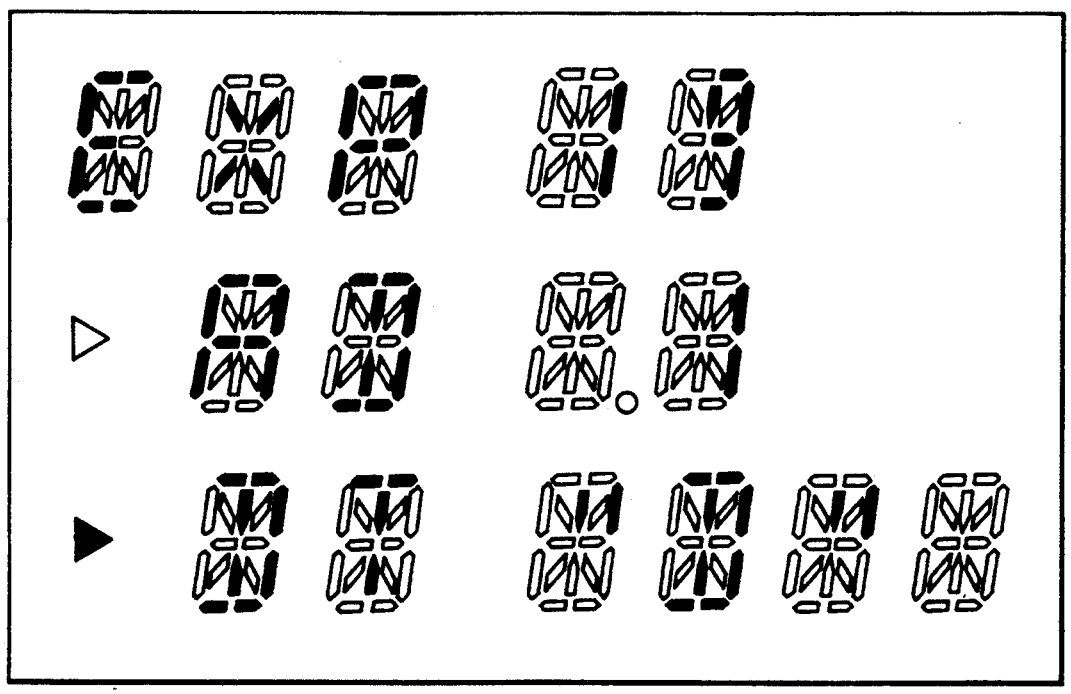
F I G. 30

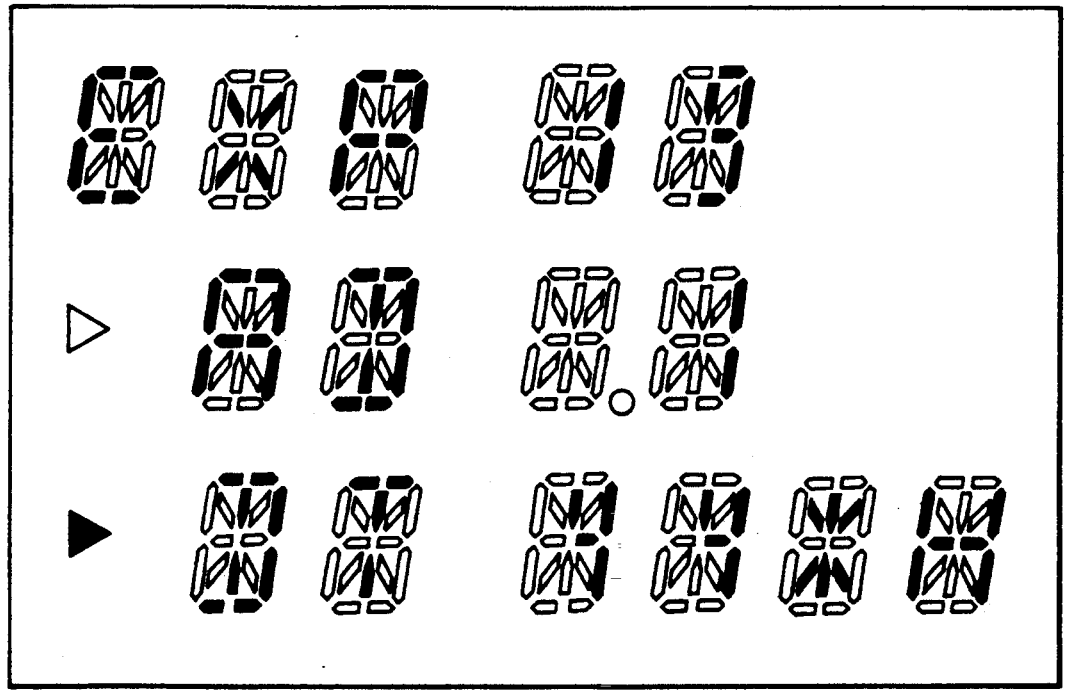
F I G. 31
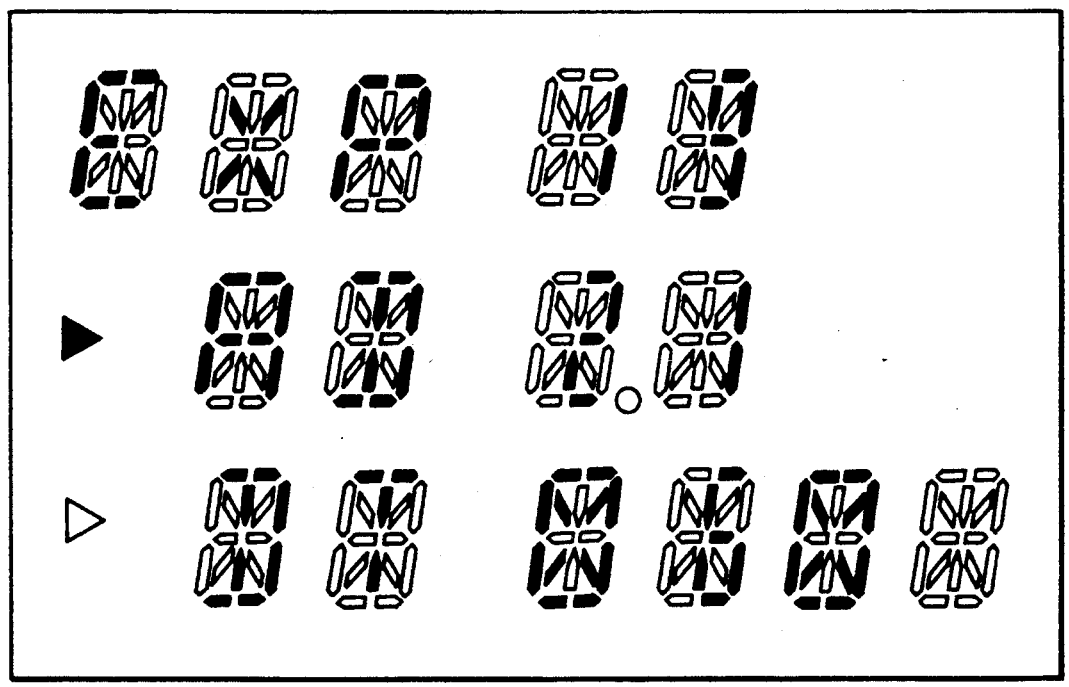
F I G. 32

DATA RECORDING APPARATUS FOR A CAMERA

BACKGROUND OF THE INVENTION

1. Field of the Invention

This invention relates to a data recording apparatus for a camera which uses a film having a magnetic recording portion in which data is recorded magnetically, and records photographic data onto the magnetic recording portion of the film.

2. Description of the Related Art

A photosensitive film with magnetic tracks in which photographic data, including the F-number and the shutter speed, can be magnetically recorded has been developed recently. In cameras using this type of film, as disclosed in Published Unexamined Japanese Patent Application No. 3-223737, for example, photographic data on each frame is stored in a data storage means (RAM) and the data in the RAM is recorded in the magnetic tracks during the rewinding action after pictures have been taken.

The apparatus disclosed in the above application, however, has no means of displaying the contents of the RAM, so that the photographer cannot see the data on the frames of pictures already taken even if he wants to. Further, there is no way to modify the photographic data if he wants to.

SUMMARY OF THE INVENTION

Accordingly, the object of the present invention to provide a magnetic recording apparatus for a camera which allows the photographer to check and modify the photographic data on the frames of pictures already taken.

According to the present invention, there is provided a magnetic recording apparatus for a camera using a film with a magnetic recording portion, comprising: magnetic recording means including a magnetic head for magnetically recording data in the magnetic recording portion of the film; film driving means for winding and rewinding the film; nonvolatile storage means storing photographic data according to the operation of exposing the film, the nonvolatile storage means being electrically rewritable; display means for displaying the photographic data stored in the nonvolatile storage means; photographic data correcting means for correcting the photographic data displayed on the display means; corrected-data writing means for writing the photographic data corrected by the photographic data correcting means in the nonvolatile storage means; and recording control means for recording at least one of (A) the photographic data stored in the nonvolatile storage means according to the operation of exposing the film and (B) the photographic data written in the nonvolatile storage means by the corrected-data writing means in the magnetic recording portion of the film by the magnetic recording means according to the operation of rewinding the film.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

Fig. 1 is a block diagram of a camera to which an embodiment of a magnetic recording apparatus for a camera according to the present invention has been applied;

FIG. 3 is a time chart for the data recording operation of the magnetic information control circuit constructed as shown in FIG. 2;

FIG. 5 is a time chart for the store mode of the communication mode between a microcomputer and the control IC in the magnetic information control circuit;

FIG. 6 is a time chart for the write mode of the communication mode;

FIG. 7 is a time chart for the read mode of the communication mode;

FIG.13 is a horizontal sectional view of the camera of the embodiment;

FIG. 14 is a perspective view of a film magazine used in the camera of the embodiment;

FIG. 17 is an operation flowchart for the RELEASE PROCESS subroutine called in the main routine of FIG. 15;

FIG. 18 is a memory map of the EEPROM of the memory unit in FIG. 1;

FIG. 19 is a table showing the contents of the photographic data stored in the EEPROM;

FIG. 20 is a character code table prescribed by ISO;

FIG. 21 is an operation flowchart for the WIND subroutine called in the RELEASE PROCESS subroutine of FIG. 17;

FIG. 24 is an operation flowchart for the REWIND subroutine called in the main routine of FIG. 15;

FIG. 29 is a view of a representation in a case where the DATA MODIFY subroutine is called when the film counter FCO indicates 19;

FIG. 30 is a view of a representation when the AD/DT switch is operated in the display state of FIG. 29;

FIG. 31 is a view of a representation when the HEX display switch is operated in the display state of FIG. 30; and FIG. 32 is a view of a representation for data that cannot be modified.

DETAILED DESCRIPTION OF THE PREFERRED EMBODIMENT

Figure 2:
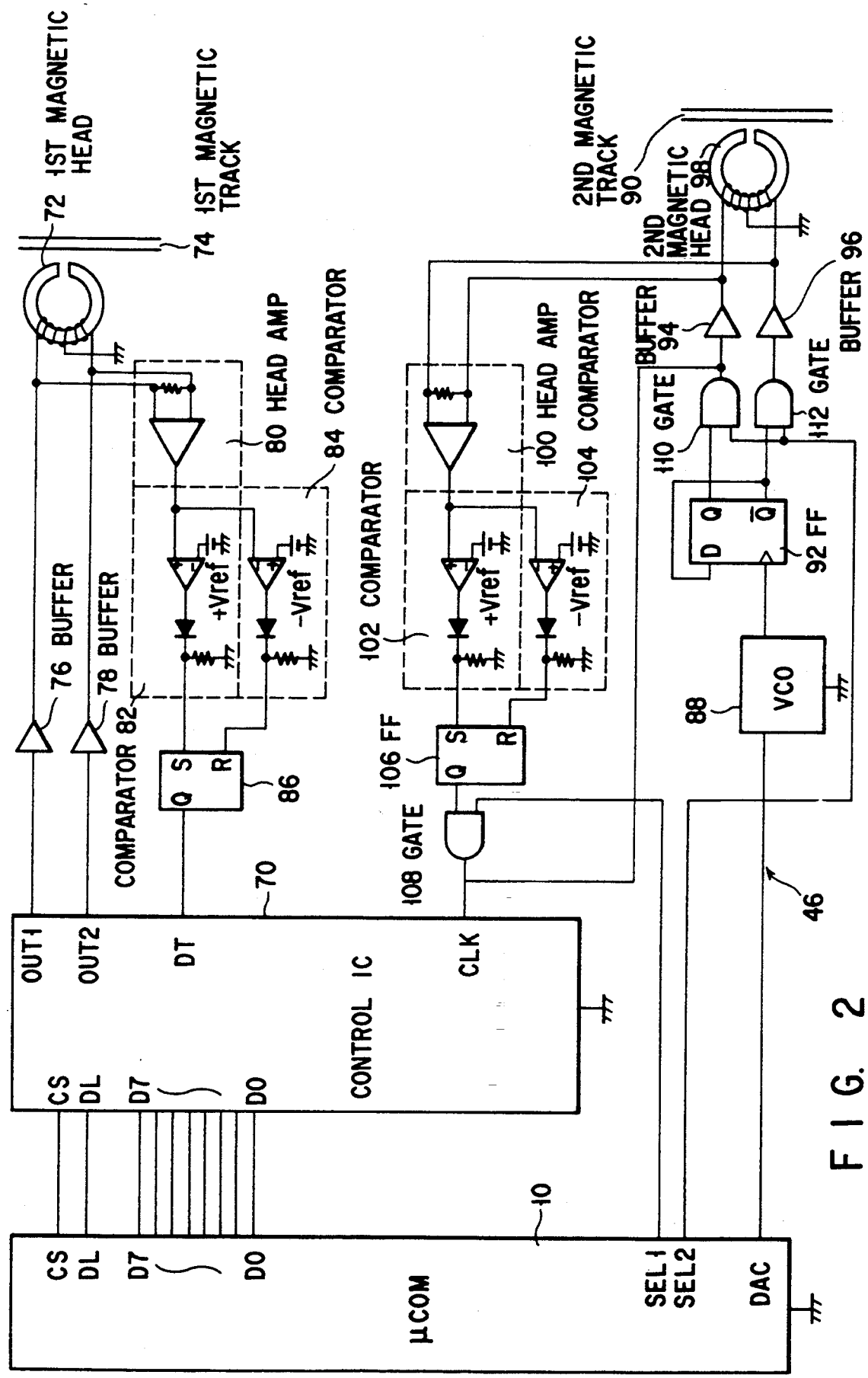
FIG. 2 is a detailed diagram showing the construction of the magnetic information control circuit of FIG. 1.

Referring to the accompanying drawings, an embodiment of the present invention will be explained.

FIG. 1 is a circuit diagram of a camera to which a magnetic recording apparatus of the invention is applied. A microcomputer (hereinafter, abbreviated as a $\mu$COM) 10 controls the entire camera. A display unit 12, which contains a liquid-crystal display (LCD), displays the operation mode and various data on the LCD under the control of the $\mu$COM 10. A dating unit 14 writes a date onto a film 16. A memory unit 18 stores data, including the number of photographic frames and adjustment data, to be recorded in one of two magnetic tracks on the film 16. For example, an EEPROM, which does not lose the stored data even if the battery voltage goes low, and an SRAM with a backup battery may be used for the memory unit 18. In the present embodiment, an EEPROM is assumed to be used. A motor control circuit 20, based on the signals from the $\mu$COM 10, sets a voltage for driving motors M1 and M2, chooses either motor, and selects a particular operation (such as rotation, reverse rotation, brake, off). The motor M1 is used to rewind the film 16, and the motor M2 is used to advance the film 16.

Connected between the motor control circuit 20 and the motor M1 and motor M2 are transistors TR1 through TR8, which constitute a motor bridge circuit. The motor M1 rotates clockwise when the transistors TR1 and TR4 are on; it rotates counterclockwise when the transistors TR2 and TR3 are on; and it brakes when the transistors TR2 and TR4 are on. The motor M2 rotates clockwise when the transistors TR5 and TR8 are on; it rotates counterclockwise when the transistors TR6 and TR7 are on; and it brakes when the transistors TR6 and TR8 are on.

A film sensitivity reading unit 22 and a sector driving unit 24 are connected to the $\mu$COM 10. The film sensitivity reading unit 22 reads the information on the film magazine 26, including the film sensitivity and the number of frames on a film, and transmits these pieces of data to the $\mu$COM 10. The sector driving unit 24, receiving the signal from the $\mu$COM 10, opens and closes a sector 28 and at the same time, transmits the open/close state of the sector 28 to the $\mu$COM 10.

Provided in a photographic lens-set barrel 30 are a focusing lens 32, a lens driving sensor unit 34 for converting the motion of the focusing lens 32 into a pulse signal and transmitting the pulse signal to the $\mu$COM 10, and a gear 36 for transmitting the amount of driving from the motor M2 to drive the focusing lens 32. Also in the barrel 30, the sector 28 driven by the sector driving unit 24 is provided to control the exposure.

A distance-measuring unit 38 for measuring the distance to a subject O and a photometer unit 40 for measuring the luminance of the subject are connected to the $\mu$COM 10, which is also connected to a flash control unit 42.

WPR 44 is a photoreflector for sensing perforations in the film 16. The WPR 44 generates and transmits two pulse signals per perforation to the $\mu$COM 10. Based on these pulse signals, the $\mu$COM 10 senses the amount of movement of the film 16.

A magnetic information control circuit 46 records data in magnetic tracks on the film and reproduces data from the magnetic tracks. A battery voltage sensing circuit 48 outputs the voltage data on a battery. (not shown) to the $\mu$COM 10.

PW SW 50 is a power switch, which is turned on to enable the photographer to take a picture. RW SW 52 is a rewind switch, which is turned on to allow the photographer to rewind the film before finishing it. REL SW 54 is a release switch, which is turned on to allow the execution of an exposure operation. BK SW 56 is a back-cover sensing switch, which turns on when the camera back-cover is opened. A data reproduction SW 58 is operated to reproduce the recorded data from a film with which photography has been finished.

A modify mode SW 60 is a switch that is operated in selecting a mode in which the data stored in the memory unit 18 (the data to be recorded in one of two magnetic tracks on the film 16) is modified. The operation of modifying the data is carried out by operating the following four switches: a HEX display SW 62, an AD/DT SW 64, an UP SW 66, and a DOWN SW 68.

FIG. 2 is a block diagram of the magnetic information control circuit 46.

The magnetic information control circuit 46 is controlled by the control lines CS, DL, D7 through D0, SEL1, and SEL2 from the $\mu$COM 10. A control IC 70, based on a command from the $\mu$COM 10, records data and a synchronizing signal in magnetic tracks on the film and reproduces data and the synchronizing signal from the tracks. A first magnetic head 72 is used to record and reproduce data in and from a first magnetic track 74. Buffers 76 and 78 flow current in the first magnetic head 72 in accordance with the outputs from the OUT1 and OUT2 terminals of the control IC 70 during data recording. A head amplifier 80 amplifies a signal generated by the first magnetic head 72 during reproduction according to the magnetic field on the first magnetic track 74. This signal is shaped in waveform by comparators 82 and 84 and a flip-flop (FF) 86 and the resulting signal is supplied to the DT terminal of the control IC 70. The control IC 70 reproduces the data on the first magnetic track 74 from the signal inputted to the DT terminal and the synchronizing signal.

Here, the clock signal inputted to the CLK terminal of the control IC 70 is used as the synchronizing signal necessary for the recording and reproducing of data.

The clock signal outputted from a VCO (Voltage Control Oscillator) 88 is used as the clock signal in data recording. A control signal to the VCO 88 is outputted from the DAC (D/A converter) terminal of the μCOM 10.

In parallel with the data recording operation, the clock signal from the VCO 88 is recorded in a second magnetic track 90. This recorded clock signal is used as a synchronizing signal in data reproduction. Specifically, the output of the VCO 88 is frequency-divided by an FF 92 and then is outputted to buffers 94 and 96. According to this output, the buffers 94 and 96 flow current in a second magnetic head 98. The signal generated by the second magnetic head 98 according to the magnetic field on the second magnetic track 90 is amplified by a head amplifier 100. The amplified signal is shaped in waveform by comparators 102 and 104 and an FF 106. A gate 108 is controlled by the SEL1 of the μCOM 10. During data reproduction, the clock signal from the FF 106 is outputted to the CLK terminal of the control IC 70.

Gates 110 and 112 are controlled by the SEL2 of the μCOM 10. During data recording, they output the clock signal from the VCO 88 to the buffers 94 and 96 and the CLK terminal of the control IC 70.

FIG. 3 is a time chart for a data recording operation in the magnetic information control circuit 46 thus constructed.

For example, the data 10110011 is assumed to be recorded. The recording of data is achieved by causing the saturated value at the north pole of the magnetization (or the saturated value at the south pole) to correspond to a 1 in the binary data and by causing the saturated value at the south pole of the magnetization (or the saturated value at the north pole) to correspond to a 0 in the binary data. This recording system is known as the NRZ (Non-Return to Zero) system. When the data is a 1, a high signal is outputted from the OUT1 terminal of the control IC 70 for a certain period of time. By the output of the OUT1 terminal, the buffer 76 flows enough current to saturate a magnetic substance in the first magnetic head 72. This magnetizes the magnetic substance of the first magnetic track 74 at the saturated value at the north pole.

On the other hand, when the data is a 0, a high signal is outputted from the OUT2 terminal of the control IC 70 for a certain period of time. This signal enables the buffer 78 to flow current in the first magnetic head 72, with the result that the magnetic substance of the first magnetic track 74 is magnetized at the saturated value at the south pole.

The time that the control IC 70 outputs signals from the OUT1 and the OUT2 terminal is determined by the clock signal inputted to the CLK terminal. This clock signal is obtained by frequency-dividing the clock signal outputted from the VCO 88. A synchronizing signal must be recorded in the second magnetic track 90 in parallel with the operation of recording the data in the first magnetic track 74. For this reason, the clock signal from the VCO 88 is frequency-divided by the FF 92 and supplied from the output terminal Q and the inverted output terminal $\overline{Q}$. The clock signals supplied from the Q and $\overline{Q}$ terminals are inputted to the buffer 94 and the buffer 96, respectively. The two buffers 94 and 96 flow current in the second magnetic head 98 alternately. This current is sufficient to magnetize the magnetic substance of the second magnetic track 90 at the saturated value at the north pole or the south pole of magnetization.

Figure 4:
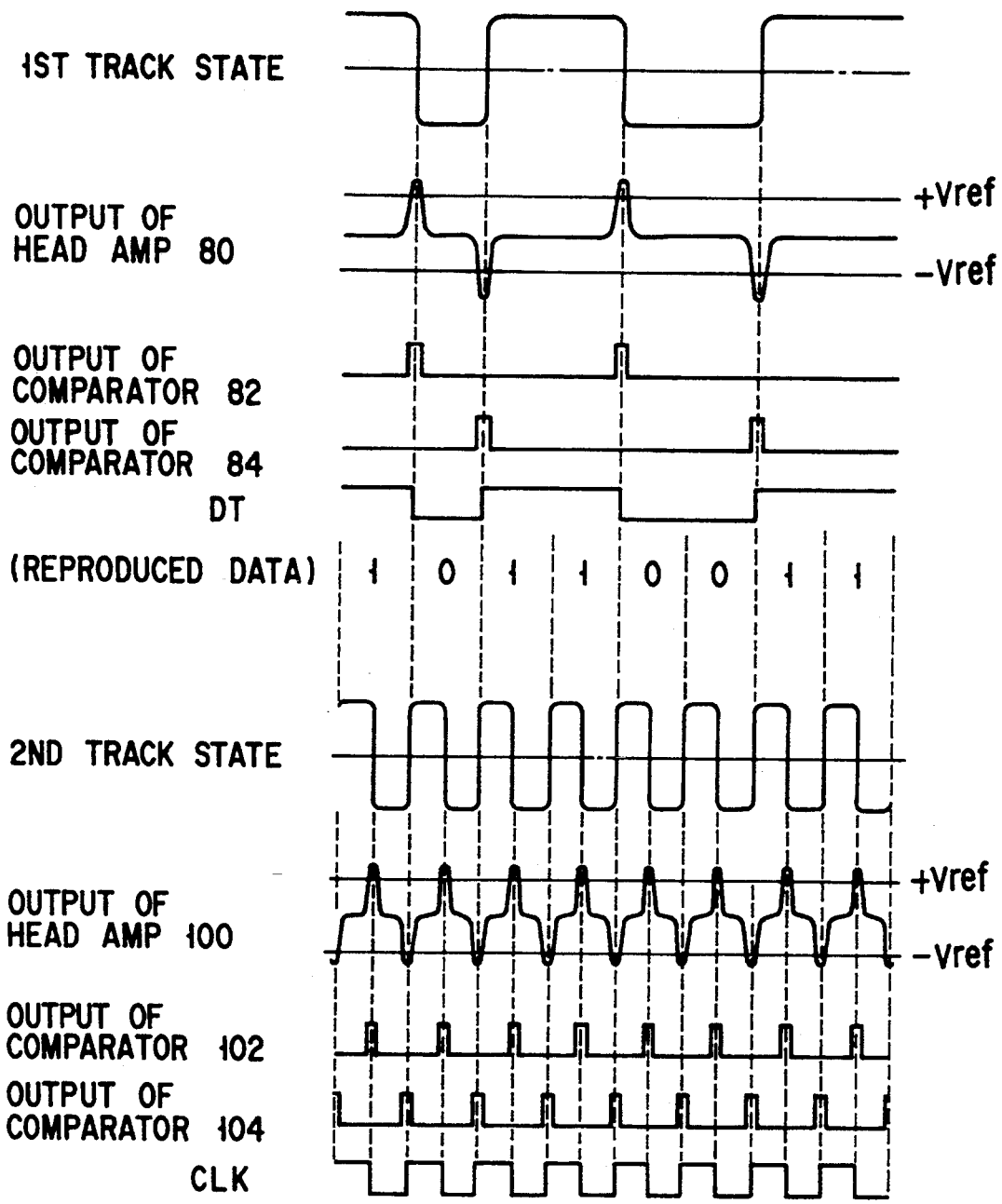
FIG. 4 is a time chart for the data reproducing operation of the magnetic information control circuit of FIG. 2.

FIG. 4 is a time chart for data reproduction.

It is well known that the moving of a magnetized magnetic substance in front of a magnetic head causes a magnetic flux passing through the magnetic head to change, making the magnetic head generate a voltage in accordance with the data recorded on the magnetic substance. Therefore, when the first magnetic track 74 is magnetized as shown in the figure, the first magnetic head 72 generates a voltage at a position where the magnetized state is reversed. This voltage is amplified by the head amplifier 80, which then supplies the amplified voltage to the comparators 82 and 84. The comparator 82 compares the output of the head amplifier 80 with +Vref and the comparator 84 compares the same output with −Vref. The comparator 82 senses the change of data from a 0 to a 1, whereas the comparator 84 senses the change of data from a 1 to a 0. The outputs of the two comparators 82 and 84 are converted by the FF 86 into a data signal, which is inputted to the DT terminal of the control IC 70.

The control IC 70 reproduces the data recorded on the magnetic substance from the inputted data signal and the synchronizing signal. Here, the clock signal recorded in the second magnetic track 90 is used as the synchronizing signal. This signal is sensed by the second magnetic head 98. The output voltage of the second magnetic head 98 is amplified by the head amplifier 100 and then converted by the comparators 102 and 104 and the FF 106 into a clock signal. The clock signal is supplied to the CLK terminal of the control IC 70.

Next, how the control IC 70 communicates with the μCOM 10 will be explained, using the time charts in FIGS. 5 through 7. Communication begins by the μCOM 10 changing the CS line from high to low. A communication request is assumed to be issued from the μCOM 10 only. After the CS line is placed in the low state, the μCOM 10 outputs command data to 8-bit data bus lines D7 through D0 in synchronization with the DL signal. This command data is used for the control IC 70 to identify the communication mode. Therefore, in any communication mode, the command data is located at the head of the communication data.

FIG. 5 is a time chart for the store mode. The store mode is a mode in which the data to be recorded is stored in a memory (not shown) contained in the control IC 70 before the recording of data in the first magnetic track.

Specifically, the μCOM 10, after the output of the command data, supplies the data to be recorded to the control IC 70 in the order of recording in the first magnetic track. Then, after the transfer of all data is finished, the μCOM 10 changes the CS line from low to high to terminate the communication.

FIG. 6 is a time chart for the write mode. The write mode is a mode in which data is recorded in the first magnetic track.

Specifically, the control IC 70, receiving the command data from the μCOM 10, outputs the data stored in the internal memory at the output terminals OUT1 and OUT2 in synchronization with the clock signal inputted to the CLK terminal. After all the data stored has been outputted, an end signal is outputted to the DL line. The μCOM 10, sensing the signal on the DL line, changes the CS line from low to high to terminate the communication.

There are two types of clock signals inputted to the CLK terminal of the control IC 70. When data is recorded in the first magnetic track 74 for the first time, the clock signal from the VCO 88 is outputted to the CLK terminal. The clock signal is then recorded as a synchronizing signal in the second magnetic track 90. As indicated by the mark " ·Ẍ·" in the figure, the SEL2 line is changed from low to high. For the synchronizing signal in a second data recording operation and later, the synchronizing signal already recorded in the second magnetic track 90 may be used. Therefore, as shown by the mark "·Ẍ·Ẍ·", the SEL1 line is changed from low to high. By doing this, the signal reproduced from the second magnetic track 90 is supplied as a clock signal to the CLK terminal.

FIG. 7 is a time chart for the read mode. The read mode is a mode in which the data and the synchronizing signal recorded in the magnetic tracks are reproduced.

Specifically, the μCOM 10, after the output of the command data, changes the SEL1 line from low to high. Then, the clock signal reproduced from the second magnetic track 90 is outputted to the CLK terminal of the control IC 70. The control IC 70 reads the data from the first magnetic track 74 in synchronization with this clock signal. In this way, after receiving 8 bits of data, it then outputs it to the bus lines D7 through D0 At this time, because the control IC 70 outputs a signal to the DL line for data latching, the μCOM 10 only requires to take in the data in synchronization with the signal on the DL line. The reproducing of the data continues until the μCOM 10 changes the CS line from low to high.

Figure 8:
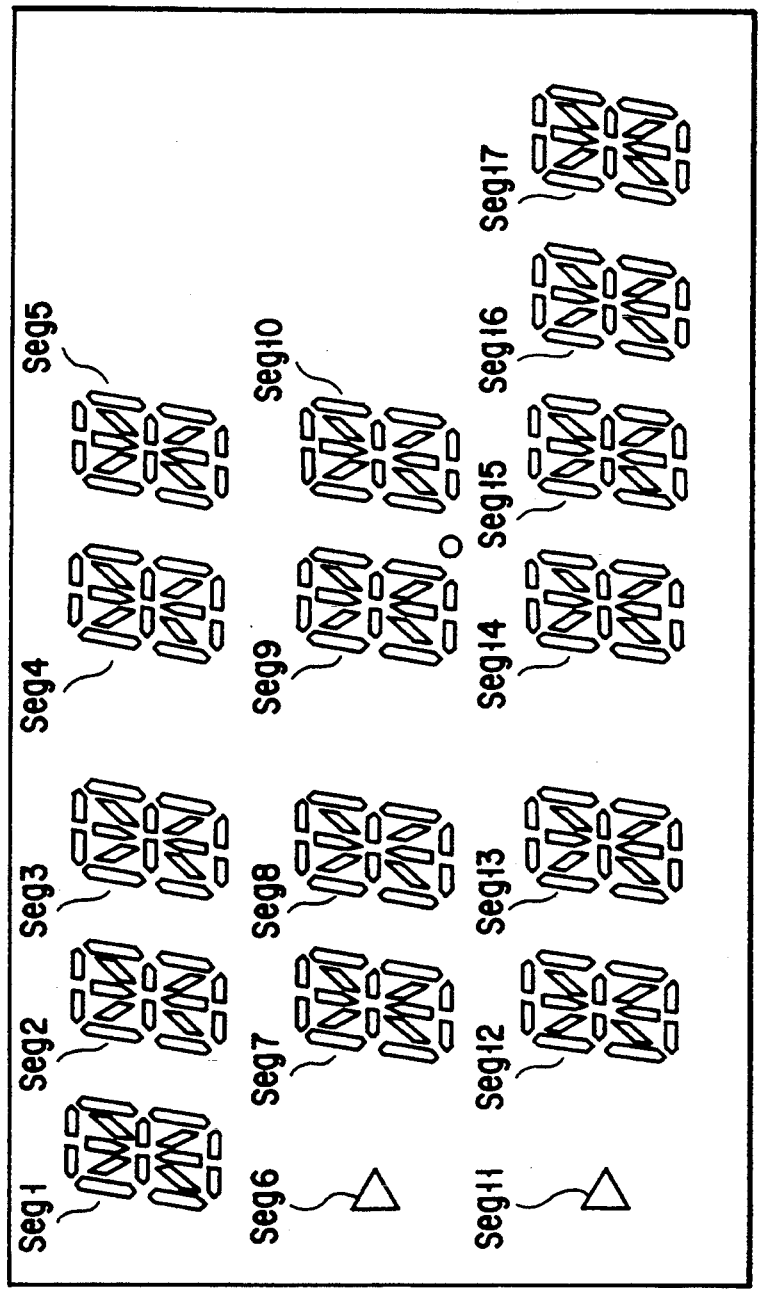
FIG. 8 is a view of the arrangement of liquid-crystal display (LCD) segments provided in the display unit of FIG. 1.

FIG. 8 shows the arrangement of the LCD provided in the display unit 12.

The LCD is composed of display segments Seg1 through Seg17. How the LCD operates will be explained later.

Figure 9:
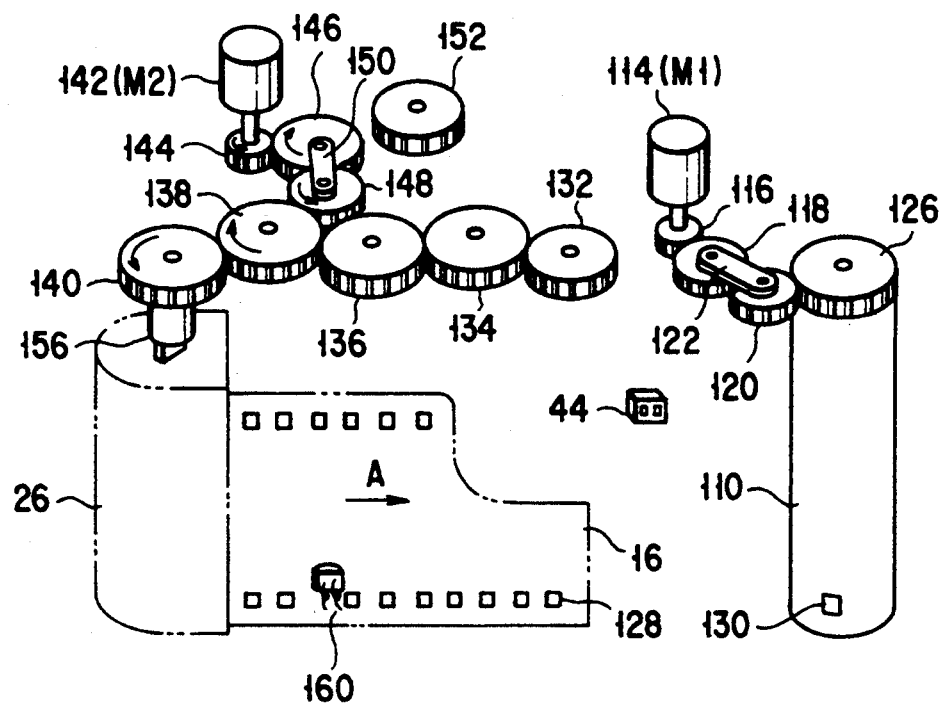
FIG. 9 is a perspective view of the state of the camera, seen from behind, immediately after a film magazine is loaded in the camera body.
Figure 10:
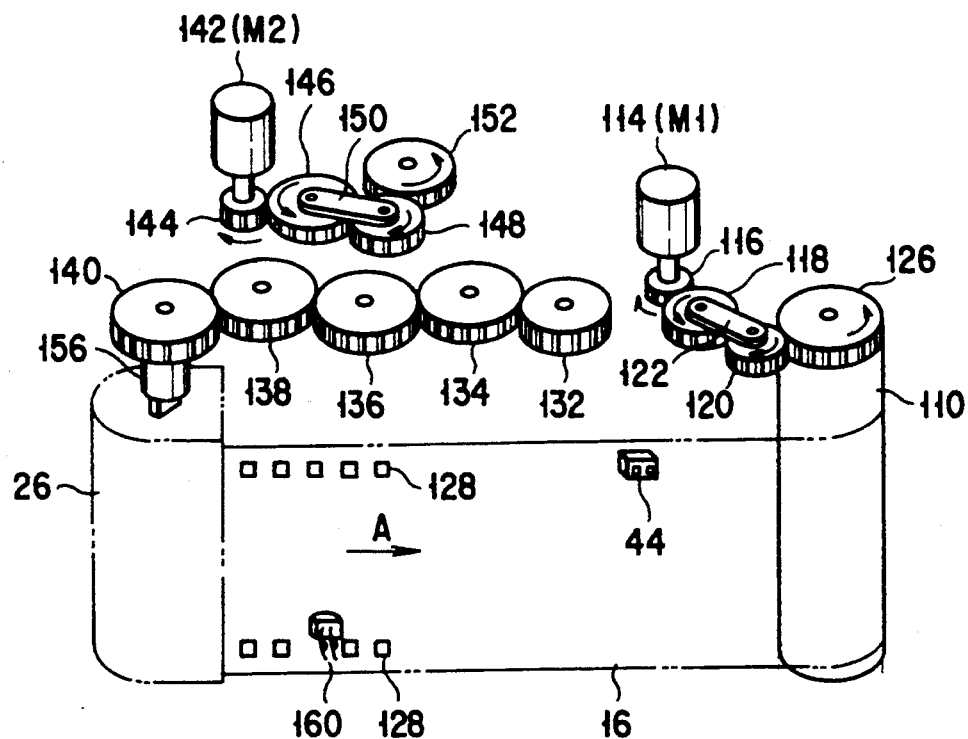
FIG. 10 is a perspective view of the state of the camera, seen from behind, in which the film is wound around the take-up spool.
Figures 11, 12:
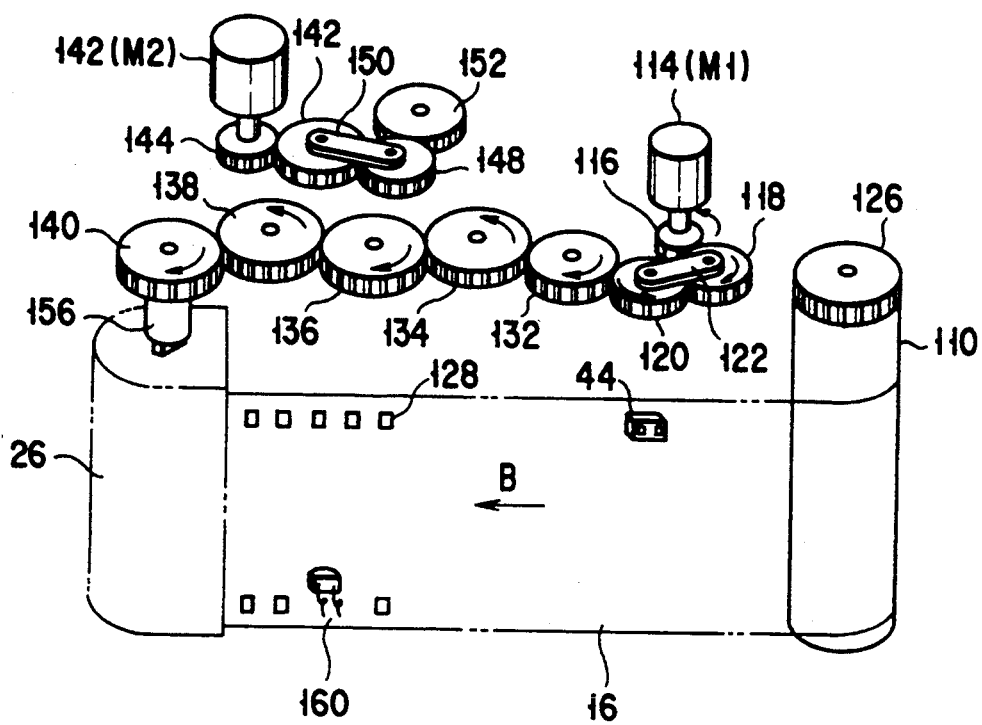
FIG. 11 is a perspective view of the state of the camera, seen from behind, in which the film is rewound in the film magazine.
FIG. 12 is a rear view of the camera of the embodiment with the back-cover removed.

FIGS. 9 through 11 are perspective views of a film advance unit, seen from behind, in a camera according to an embodiment of the present invention. Specifically, FIG. 9 is a perspective view of the state of the camera immediately after a film magazine 26 is loaded in the camera body; FIG. 10 is a perspective view of the state of the camera in which the film 16 is wound around the take-up spool 110; and FIG. 11 is a perspective view of the state in which the film 16 is rewound in the film magazine 26. FIG. 12 is a rear view of the camera of the embodiment with the back-cover removed. FIG. 13 is a horizontal sectional view of the camera of the embodiment. FIG. 14 is a perspective view of the film magazine 26 used in the camera of the embodiment.

A pinion gear 116 is provided on the output spindle of a film wind/rewind motor 114 (M1) in the camera body 112. The pinion gear 116 engages with a sun gear 118. The sun gear 118 also engages with a planet gear 120. The planet gear 120 is supported via a gear arm 122 so as to revolve around the rotating spindle of the sun gear 118.

In a film take-up compartment 124 provided on the right side of the camera body 112 viewed from behind, a take-up spool 110 for taking up the film is provided so as to rotate freely. At the top surface of the take-up spool 110, a spool gear 126 is integrally formed which engages with the planet gear 120 when the planet gear 120 revolves counterclockwise. Further, a perforation mating pin 130 that engages with a perforation 128 in the film 16 protrudes from the lower outer surface of the take-up spool 110, which will be explained later.

An idle gear 132 is provided in a position where it engages with the planet gear 120 when the planet gear 120 revolves clockwise. At this time, the planet gear 120 is connected with a coupler gear 140 explained later via idle gears 132, 134, 136, and 138.

On the other hand, the camera body 112 is also provided with a film advance motor 142 (M2). The output spindle of the film advance motor 142 is provided with a pinion gear 144, which engages with a sun gear 146. The sun gear 146 also engages with a planet gear 148, which is supported so as to revolve around the rotating spindle of the sun gear 146 via a gear arm 150. A shutter charge gear 152 is provided in a position where it engages with the planet gear 148 when the planet gear 148 revolves counterclockwise.

On the left side of the camera body 112 viewed from behind, a magazine compartment 154 is provided which houses the film magazine 26 shown by double-dot chain lines in FIG. 9. Above the magazine compartment 154, a coupler gear 140 is provided so as to rotate freely which has a coupler 156 formed so that its tip may protrude in a "-" shape as shown in FIG. 12. The coupler 156, as shown in a perspective view of FIG. 14, engages with a groove in the top surface of a supply spool 158 in the film magazine 26 so as to be integrate with the supply spool 158 and the spindle fittings. The coupler gear 140 always engages with the idle gear 138 as mentioned earlier.

A photoreflector WPR 44 that produces a pulse signal each time a perforation 128 in the film 16 masses is secured to the camera body 112 in a position somewhat nearer to the center than the take-up spool 110 and at a height facing the perforation 128 in the film. A magnetic head 160 composed of the first and second magnetic heads 72 and 98 is provided to the side of the film magazine 26. The reason for this is that data is recorded in the first magnetic track, interlocking with a rewinding operation.

The film magazine compartment 154 and the film take-up compartment 124 are integrally formed out off the same member as shown in FIG. 13 and are housed in the camera body 112. In front of them, a shutter mechanism 162 and a photographic lens 164 are provided. Further, batteries 166 and a strobe capacitor 168 are housed on the right side of the film take-up compartment 124.

At the back of the film magazine compartment 154, a back-cover 170 is provided on the camera body 112 so that it can be opened and closed. On its right, a pressure plate 172 is provided which presses the film 16 forward. In the portion facing the pressure plate 172, film rail surfaces 174 and pressure rail surfaces 176 are provided. The film 16 is pressed by these surfaces to maintain flatness.

The pressure plate 172, film magazine compartment 154, and pressure rail surface 176 are provided with guide slopes 178, 180, and 182, respectively. These guide slopes 178, 180, and 182 guide the film so as to keep its height constant when the film 16 is fed from the supply spool 158 in the film magazine 26.

Using a flowchart, the operation of the μCOM 10 will be explained.

Figure 15:
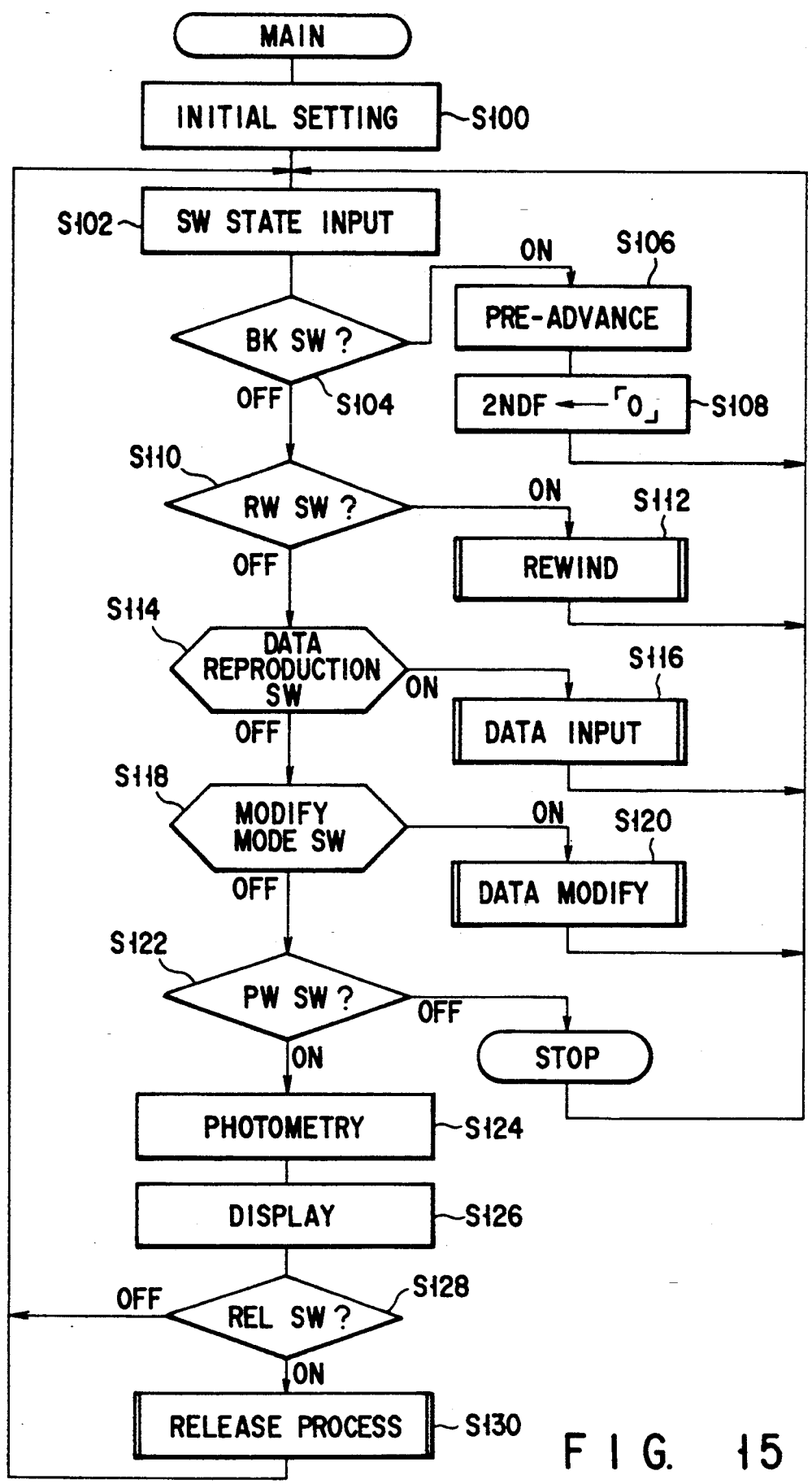
FIG. 15 is a flowchart for the main routine executed on the microcomputer.

Referring to FIG. 15, the operation of the main routine will be explained. When batteries 166 are loaded in the camera, the μCOM 10 carries out power-on reset. Then, the operation starts in step S100, where initial settings including the initialization of the I/O Ports and the memory are achieved.

Next, in step S102, the state of various switches connected to the μCOM 10 is input. Then, in step S104, the state of the BK SW 56 is judged. When the back-cover 170 changes from open to closed, the BK SW 56 changes from OFF to ON. This means that a film magazine 26 is loaded. After this change is sensed, control proceeds to step S106. In this step S106, Pre-Advance, an action of winding the film 16 around the take-up spool 110, is executed. Then, in step S108, a second flag 2NDF is cleared. The 2NDF is a flag used in the REWIND subroutine explained later. After the flag is cleared, control goes to step S102.

When control has advanced from step S104 to step 110, the state of the rewind switch RW SW 52 is judged. When the RW SW 52 is in the ON state, control goes to step S112. In step S112, the REWIND subroutine is executed. The operation of this subroutine will be explained later.

when the RW SW 52 is in the OFF state, control proceeds to step S114, where the state of the data reproduction SW 58 is judged. The data reproduction SW 58 is operated when the photographer wants to reproduce the data recorded in a film with which photography is already finished or an exposed film. In such a case, the photographer (or the operator), after loading the exposed film, places the switch 58 in the ON state. When the data reproduction SW 58 is already in the ON state, control goes to step S116, where the DATA INPUT subroutine is executed. In this subroutine, the data and synchronizing signal are reproduced from the magnetic tracks on the film 16 and the reproduced data is stored in the EEPROM of the memory unit 18. The operation of the subroutine will be explained later.

When the data reproduction SW 58 is in the OFF state, control moves to step S118, where the state of the modify mode SW 60 is judged. The modify mode SW 60 is operated when it is necessary to check and modify the photographic data stored in the EEPROM. When the modify mode SW 60 is in the ON state, control proceeds to step 120, where the DATA MODIFY subroutine is executed. The operation of this subroutine will be explained.

When the modify mode SW 60 is in the OFF state, control advances to step 122, where the state of the power switch PW SW 50 is judged. If the PW SW 50 is in the OFF state, the μCOM 10 goes to the STOP mode. Entering the STOP mode, the μCOM 10 stops operation. The operation of the μCOM 10 resumes when an interrupt signal occurs as a result of operating the above-mentioned various switches.

When the PW SW 50 is in the ON state, control goes to step S124. In step S124, the F-number (FNo.) and shutter speed are calculated from the measured luminous intensity from the photometer unit 40 and the film sensitivity from the film-sensitivity reading unit 22. The calculation results appear on the LCD of the display unit 12 in step S126.

Figure 16:
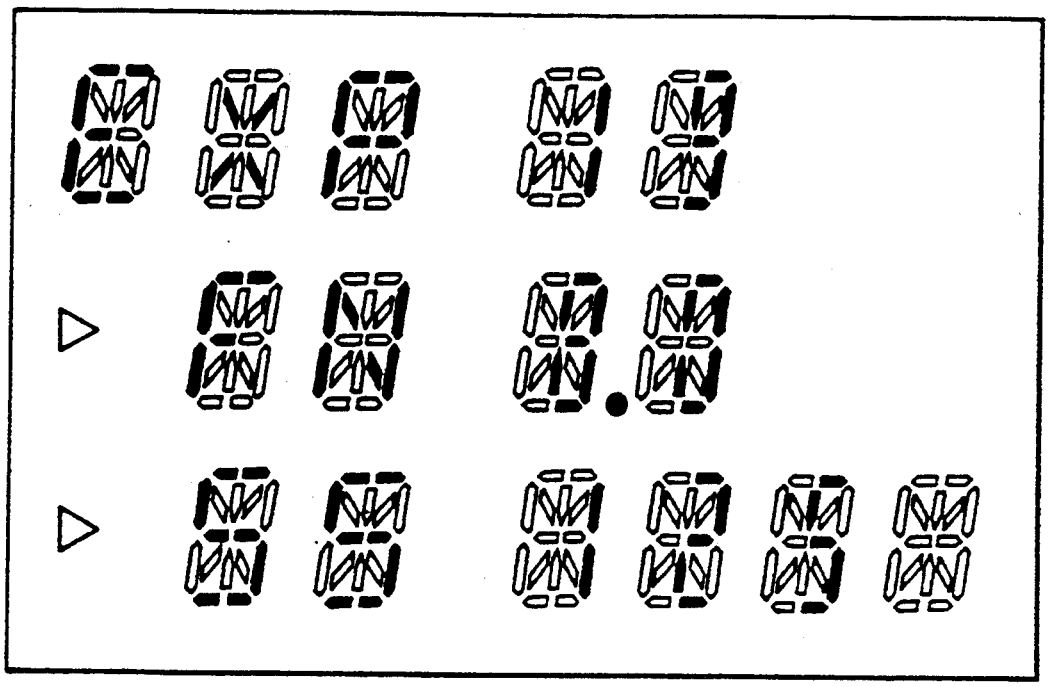
FIG. 16 is a view showing how a presentation appears on the display unit of FIG. 1.

FIG. 16 shows how a representation appears on the LCD of the display unit 12. Specifically, EXP 19 appearing on segments Seg1 through Seg5 means the number of frames. In this example, it is the 19th frame. FN 8.0 on Seg7 through Seg10 indicates that FNo.=8.0. SS 125 on Seg12 through Seg 17 means that the shutter speed is 1/125 second.

After such representation in step S126, the state of the release switch REL SW 54 is judged in step S128. When the REL SW 54 is in the ON state, control goes to step S130, where the RELEASE PROCESS subroutine is executed. The operation of this subroutine will be explained later.

When the REL SW 54 is in the OFF state, control proceeds to step S102 in order to enter the state of the individual switches mentioned above.

Referring to FIG. 17, the operation of the RELEASE PROCESS subroutine in step S130 will be explained.

In step S200, the data necessary for AE and AF computations are read from the EEPROM. In step S202, the film sensitivity is read from the film magazine 26 via the film-sensitivity reading unit 22. In step S204, a distance-measuring action and a photometric action are carried out using the distance-measuring unit 38 and the photometer unit 40, in order to obtain the measured distance and the measured luminous intensity. In step S206, the lens advance amount is computed from the measured distance. The exposure time is computed from the measured luminous intensity. In step S208, the data identical to that to be recorded in the first magnetic track is stored in the EEPROM.

Next, in step S210, the film advance motor M2 is rotated clockwise to advance the focusing lens 32. The advance amount is measured by counting the pulse signals generated at the lens driving sensor unit 34. Then, when the count has reached the lens advance amount computed in step S206, the driving of the motor M2 is stopped. In the case of a single-lens reflex camera, the mirror is upped at this moment.

Next, in step S212, a signal is sent to the sector driving unit 24 to drive the sector 28 for exposure. A signal is sent to the flash control circuit 42, if necessary, to use a flash. After exposure is finished, the date is written in step S214. After this, the REWIND subroutine is executed in step S216. The operation of this subroutine will be explained later. Then, in step S218, the focusing lens is returned to the initial position.

Here, the data stored in the EEPROM will be explained.

FIG. 18 shows a memory map for the EEPROM. The number of frames on a film, the adjusting data necessary for AE and AF computations and other information are stored in addresses AD1 through ADX. The photographic data on a first frame is stored in addresses AD1_1 through AD1_N. Similarly, the photographic data on each of the remaining frames is stored in the following and later addresses.

The contents of the photographic data are shown in FIG. 19. For example, the data on the 19th frame is assumed to be shown in FIG. 19. Addresses AD19_1 through AD19_N correspond to numbers 1 through N.

The data at numbers 1 through 14 is the date data. Here, the data is based on the character code table shown in FIG. 20. FIG. 20 shows a character code table prescribed by ISO. ASCII codes prescribed by ANSI may, of course, be used. Storing data based on such a code table makes it easier to use data. The numeral data is provided with character data for identification. Specifically, the character data DATE at numbers 1 through 4 means that the numeral data at numbers 5 through 14 is date data. Similarly, it means that TV, AV, and EXP indicate the shutter speed, the FNo., and the number of frames, respectively.

The data in the EEPROM can be modified using the DATA MODIFY subroutine (in step S120) explained later. The ability to change all data has a chance to destroy the important data. For this reason, changeable data and unchangeable data are formed.

Next explained will be a method of distinguishing these two types of data. The data to be stored in the EEPROM is formed according to the above code table. When a character is converted using the code table, the data length is 7 bits. Since data recording is achieved in units of 8 bits, one bit is left over. This extra bit is used as a mask bit. That is, the data whose mask bit is a 1 is assumed to be prohibited from modification.

It is assumed that the data at numbers N-10 through N is modification-prohibited data. The data in parentheses is data based on the code table. When the MSB is determined to be a mask bit, to make the mask bit a 1, it is necessary to add 80 (HEX) to the data in parentheses. The mask bit is used in the DATA MODIFY subroutine.

Judging whether or not modification is prohibited may be achieved by a method other than using a mask bit. For example, data modification may be prohibited for a particular address. Further, as shown by the mark " " in FIG. 19, particular data FF may be provided to separate the data changeable area from the data unchangeable area.

Next, referring to FIG. 21, the WIND subroutine in step S216 will be explained.

In step S300, by rotating the film wind/rewind motor M1 clockwise, the spool 110 starts to roll up the film 16. In step S302, the timer counter is cleared. Then, in step S304, the timer counter starts to count.

Next, in step S306, the counter is cleared. The counter is used to count pulse signals supplied from the photoreflector WPR 44 to the μCOM 10. Each time a pulse signal arrives, the counter is incremented. Then, in step S308, the counter starts to operate.

In the following step S310, it is judged whether or not the value of the counter has reached 16. After one frame of the film has been counted, the value of the counter becomes 16. When the counter indicates 16, control goes from step S310 to step S312.

In step S312, the motor M1 is braked, and in step S314, the supplying of power to the motor M1 is stopped. In the next step S316, the film counter FCO is incremented. In step S318, it is judged whether or not the value of FCO is EXPn. The value EXPn is the number of frames on the film loaded, which shows how many pictures can be taken. When the FCO reaches EXPn, the picture-taking action is finished, and control moves to the REWIND subroutine explained later. When it has not reached EXPn yet, control returns.

On the other hand, in step S310, when the counter has not arrived at 16 yet, control proceeds to step S320. In step S320, it is judged whether or not the value of the timer counter has exceeded a specified value TW. The specified value TW is the maximum of the time required to wind one frame. When the winding action has not finished even after the value of the timer counter has reached TW, it means that the film has reached its end. That is, the film is in deadlock in the course of the winding action. In this case, control moves from step S320 to step S322 to brake the motor M1. Then, in step S324, the supplying of power to the motor M1 is stopped. In the following step S326, the motor M1 is rotated counterclockwise. Then, in step S328, the counter starts to count down. This allows the counter to be decremented by one each time a pulse signal from the photoreflector WPR 44 arrives.

Then, in step S330, control stays there until the value of the counter reaches 0. When the value of the counter has reached 0, control goes to steps S332 and S334 to stop the rotation of the motor M1.

Figure 22:
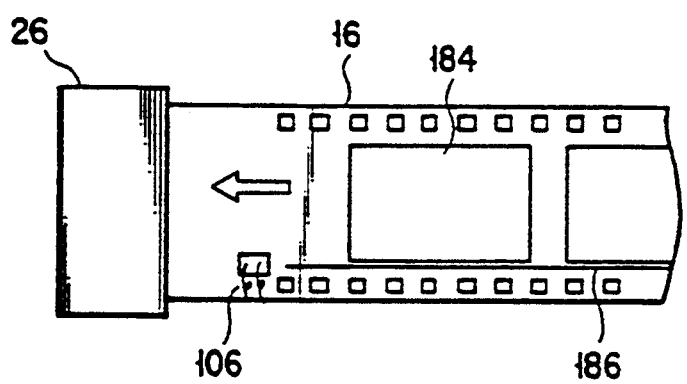
FIG. 22 is a view showing the positional relationship between the picture area and the magnetic head when the winding action is incomplete.
Figure 23:
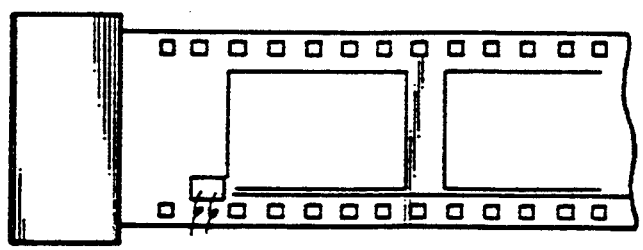
FIG. 23 is a view showing the state in which the gap between the picture area and the magnetic head is corrected by moving the film toward the film magazine.

The processes in steps S326 through S334 are for positioning the film 16. Specifically, when then winding action is incomplete, there is a gap between the photographic area 184 and the magnetic head 160, as shown in FIG. 22. With this gap, if control proceeds to the REWIND subroutine and data recording is achieved, the photographic area 184 shifts from the area of the magnetic track 186 made up of the first and second magnetic tracks 74 and 90 in which the photographic data is recorded. For this reason, the film 16 is moved toward the film magazine 26 to position the film as shown in FIG. 23. This operation is performed in steps S326 through S334. It is usually impossible for control to proceed from step S320 to the REWIND subroutine. Normally, control moves from step S318.

Next, referring to FIG. 24, the REWIND subroutine in step S112 will be explained. In this subroutine, the film 16 with which photography is finished is rewound to the film magazine 26 and at the same time, the photographic data is recorded in a magnetic track 186.

In step S400, the data on the battery voltage is input from the battery-voltage sensor circuit 48. In step S402, based on this data, a specified value is set in a D/A converter (not shown) built in the μCOM 10. The output of the D/A converter is supplied to the VCO 88 of the magnetic information control circuit 46. The reason why the control voltage of the VCO 88 is determined by the battery voltage is that the data recording speed is varied according to the moving speed of the film 16. Because the high battery voltage makes the moving speed of the film 16 faster, the recording speed is also made faster. Conversely, when the battery voltage is lower, the recording speed is made slower. This keeps the data density on the magnetic track 186 constant. The battery voltage is not necessarily constant during the rewinding operation. Therefore, the voltage may be always sensed even during the rewinding operation to change the control voltage of the VCO 88 in real time.

In step S404, the motor M1 is rotated counterclockwise to start to rewind the film 16. In step S406, address ADn_N in the EEPROM is set in the register ADRS1. The address ADn_N is the bottom address in the area in which the photographic data is stored. In step S408, the counter is cleared. This counter is used to count pulse signals supplied from the photoreflector WPR 44 to the μCOM 10. In the next step S410, the counter starts to count up. Therefore, the counter is incremented each time a pulse signal has arrived. When the counter has reached 16, it means that one frame of film has been rewound.

In the following step S412, the DATA STORE subroutine is executed. In this subroutine, one frame of photographic data is transferred to the control IC 70 before a data recording operation. The operation of this subroutine will be explained later.

In the following step S414, control stays there until the value of the counter reaches a specified value PFCx. As a result of the process in step S414, an area that contains no data occurs in the magnetic track 186. This separate the photographic data on adjacent frames from each other. A suitable value is determined for the specified value PFCx, taking into account the amount of data recorded and the recording density.

When the counter has arrived at the specified value PFCx, control moves to step S416. In step S416, a write command is issued to the control IC 70. In step S418, the state of the second flag 2NDF is judged. The 2NDF is used to select the synchronizing signal required for a data recording operation. Namely, when data is recorded in the magnetic track 186 for the first time, the 2NDF is cleared to 0. To record data for the first time, it is necessary to use the clock from the VCO 88 as a synchronizing signal and at the same time, record the synchronizing signal in the magnetic track 186 (the second magnetic track 90). Therefore, in step S420, the SEL2 line is changed from low to high. When the 2NDF is already set to 1, it means the second or later recording operation. That is, it is a time when the data already recorded is to be modified. At this time, it is necessary to record the data on the basis of the synchronizing signal already recorded in the magnetic track 186 (the second magnetic track 90). Then, control moves to step S422 to change the SEL1 line from low to high.

Here, the reason why the synchronizing signal is inputted from the magnetic track 186 (the second magnetic track 90) will be explained. When the data recording operation is carried out again by the magnetic information control circuit 46 of FIG. 2, it is not necessary to erase the magnetic track 186. It is because the data is recorded by magnetizing the magnetic substance at the saturated value at the north pole or the south pole. Therefore, the state of the magnetic substance before the data is recorded is not a problem. When recording is achieved for the second time, however, the previous data remains unless the data is recorded exactly on the previous data. If the previous data remains, the necessary data cannot be reproduced correctly. When data is recorded according to the synchronizing signal on the magnetic track 186, new data can be recorded while old data is being erased completely. For this reason, the control IC 70, receiving a write command, records the data received in step S412 in the magnetic track 186 (the first magnetic track 74) in synchronization with the clock signal inputted to the CLK terminal.

In this way, during the time when the control IC 70 is recording, that is, until the end signal that the control IC 70 outputs on the DL line is sensed, the μCOM 10 is in the waiting state. When the DL line goes low, the data recording is completed.

Next, control goes to step S426, where the CS line changes from low to high and the SEL line changes from high to low. The recording of one frame of photographic data by the control IC 70 is finished. In step S428, control stays there until the value of the counter reaches 16. When the counter has arrived at 16, the rewinding of one frame is completed. In step S430, the film counter FCO is decremented by one. In step S432, the value of the FCO is allowed to appear on Seg4 and Seg5 of the LCD of the display unit 12. After this, in step S434, it is judged whether or not the value of FCO has reached 0. If it is not 0, the photographic data on the next frame must be recorded. Therefore, control goes to step S408.

When the film counter FCO indicates 0, control proceeds to step S436. In step S436, waiting for two seconds allows the film 16 to be housed in the magazine 26 completely. Then, in step S438, the motor M1 is braked and in step S440, power supply is stopped. This completes the rewinding operation and control returns.

Figure 25:
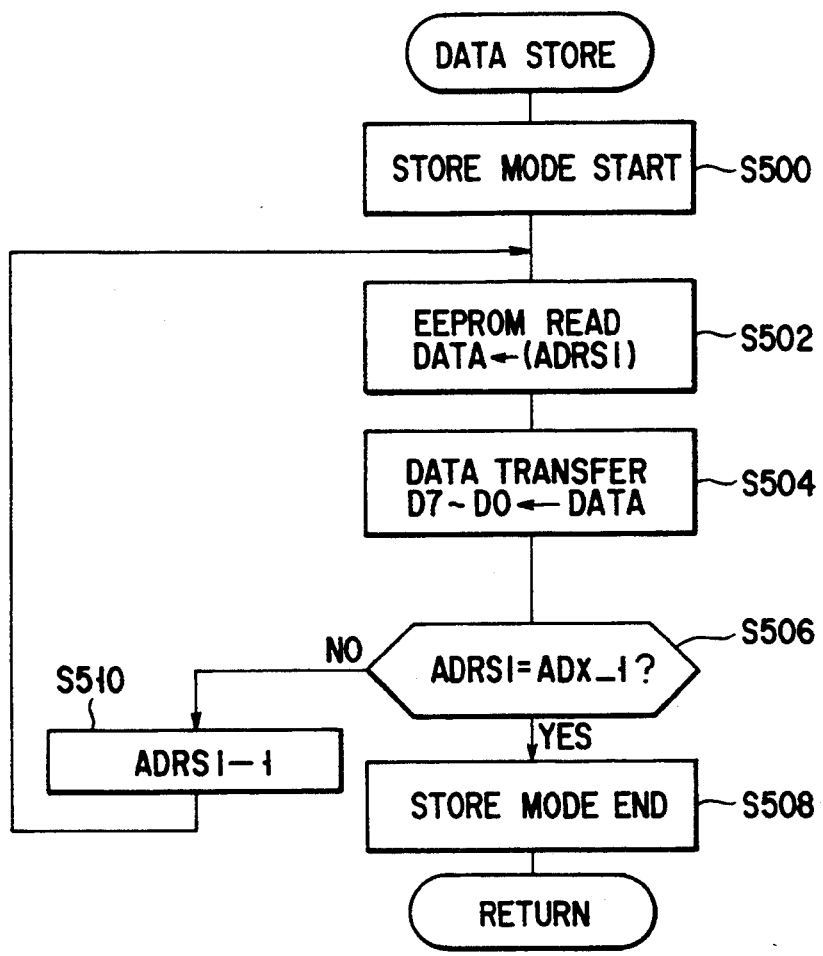
FIG. 25 is an operation flowchart for the DATA STORE subroutine called in the REWIND subroutine of FIG. 24.

Next, referring to FIG. 25, the DATA STORE subroutine in step S412 will be explained.

This subroutine stores one frame of photographic data in the memory (not shown) of the control IC 70 prior to a data recording operation. In step S500, a store command is issued to the control IC 70. In the next step S502, the data in the address in the EEPROM specified by the register ADRS1 is read. There, in step S504, this data is outputted onto the bus lines D7 through D0. The control signal enters the data on the bus lines in synchronization with the latch signal. In step S506, it is judged whether or not the register ADRS1 holds ADx_1. The ADx_1 is the top address of the area in the EEPROM in which the photographic data corresponding to the film counter FCO is recorded. When the ADRS1 contains ADx_1, this means the completion of transferring one frame of photographic data. Therefore, control proceeds to step S508, the CS line is changed from low to high and the store mode is finished. On the other hand, when the ADRS1 does not contain ADx_1, control goes to step S510 to decrement the address value in the ADRS1. Then, control advances to step S502.

Figure 26:
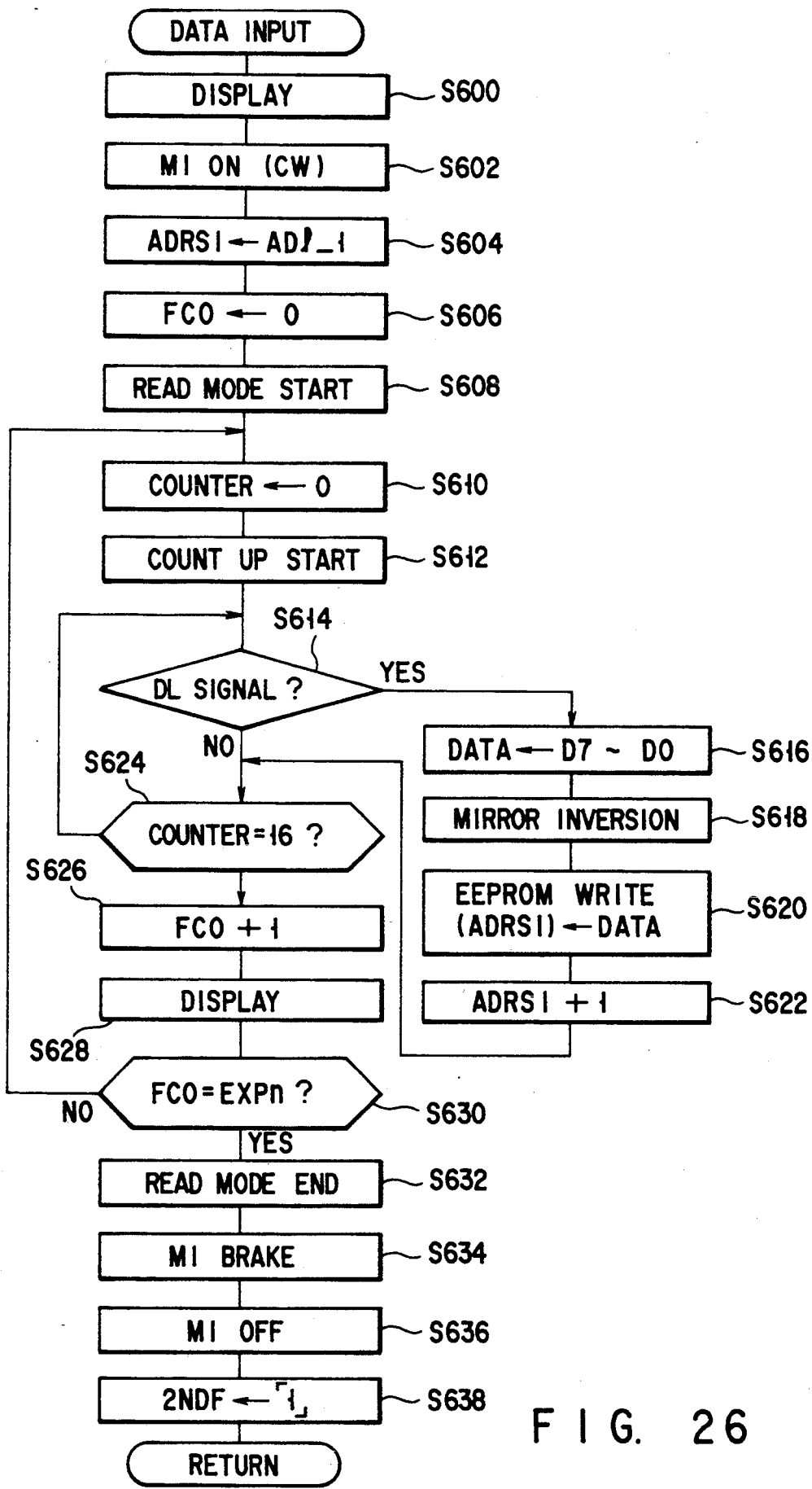
FIG. 26 is an operation flowchart for the DATA INPUT subroutine called in the main routine of FIG. 15.

Next, referring to FIG. 26, the DATA INPUT subroutine in step S116 will be explained. This subroutine is used to reproduce the data from a film with which photography is already finished and in which data has therefore been recorded. The reproduced data is stored in the EEPROM. The arrangement of data stored in the EEPROM is the same as in FIG. 18.

Figure 27:
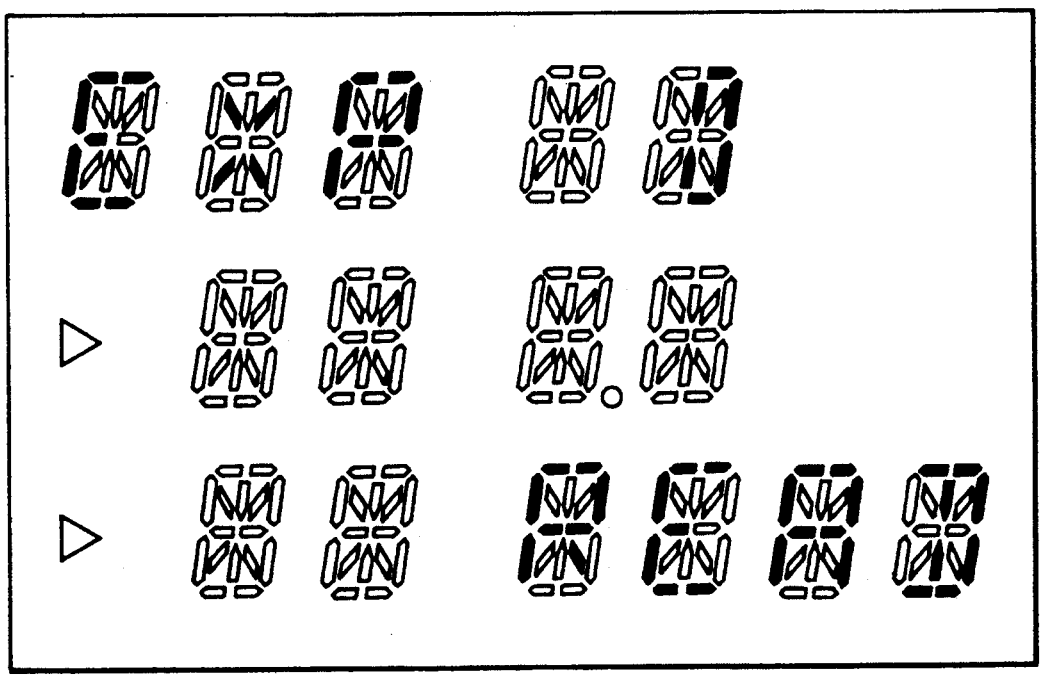
FIG. 27 is a view showing the display state at the start of the DATA INPUT subroutine called in the main routine of FIG. 15.

Specifically, in step S600, a specified representation is allowed to appear on the LCD before the start of operation. FIG. 27 show an example. The number of frames on a film appears on segments Seg1 through Seg5. Each time the reproduction of one frame of data is completed, the number of frames is incremented. READ appears on segments Seg14 through Seg 17 to notify the operator of data reproduction.

Next, in step S602, by rotating the film wind/rewind motor M1 clockwise, the spool 110 starts to roll up the film 16. In step S604, AD1_1 is set in the register ADRS1. The AD1_1 is the top address of the area in the EEPROM in which photographic data is stored. In step S606, the film counter FCO is cleared. In step S608, a read command is issued to the control IC 70. The control IC 70, receiving the read command, reproduces the data according to the synchronizing signal reproduced from the second magnetic track 90. In step S610, the counter is cleared. This counter counts pulse signals supplied from the photoreflector WPR 44 to the μCOM 10. The counter is incremented each time a pulse signal arrives. Then, in the following step S612, the counter starts to operate.

Next, in step S614, it is judged whether or not the control IC 70 has outputted a latch signal on the DL line. When the latch signal is on the DL line, control goes to step S616; when it is not outputted, control proceeds to step 8624.

When control has arrived in step S616, the reproduced data from the control IC 70 is inputted from the data bus D7 through D0. In step S618, the data thus inputted is mirror-inverted. Specifically, the moving direction of the film during data recording is opposite to the moving direction during reproduction. Therefore, it is necessary to reverse the order of data. For example, when 10100001 is reproduced, then 10000101 is obtained. Therefore, it must be subjected to mirror inversion. In the following step S620, this data is stored in the address in the EEPROM specified by the ADRS1. Then, in step S622, the ADRS1 is incremented. Then, control goes to step S624.

In step S624, it is judged whether or not the value of the counter has reached 16. When the counter indicates 16, it means the completion of the winding of one frame. When the counter has not reached 16 yet, control goes to step S614 to judge the state of the DL line.

When the counter has reached 16, control moves to step S626 to increment the FCO. Then, in step S628, the value of the FCO is allowed to appear on segments Seg4 and Seg5 of the LCD. In step S630, it is judged whether or not the FCO value has arrived at EXPn. Here EXPn is the number of frames on the film loaded, which shows how many pictures can be taken. When the FCO does not indicate EXPn, control proceeds to step S610, where the entering of data is continued.

Then, when the FCO has reached EXPn, control proceeds to step S632 to stop the read mode of the control IC 70. In step S634, the motor M1 is braked and in step S636, power supply is stopped. In step S638, the second flag 2NDF is set. Then, control returns.

When the 2NDF is set, the synchronizing signal recorded in the second magnetic track 90 is used as a synchronizing signal required to record data in the first magnetic track 74. The fact that the DATA INPUT subroutine has been called means that a data recording operation has been executed at least once. Therefore, the 2NDF must be set.

In this embodiment, the flowchart is written so that when the film counter FCO has reached EXPn, the data input operation may finish. If the number of pictures taken is larger than the number of frames indicated by EXPn, all data cannot be entered. This problem can be avoided by constructing the flowchart so that data input may be continued until the film is rolled up to the end. As a method suitable for actual use, the latter method is practical.

Figure 28A:
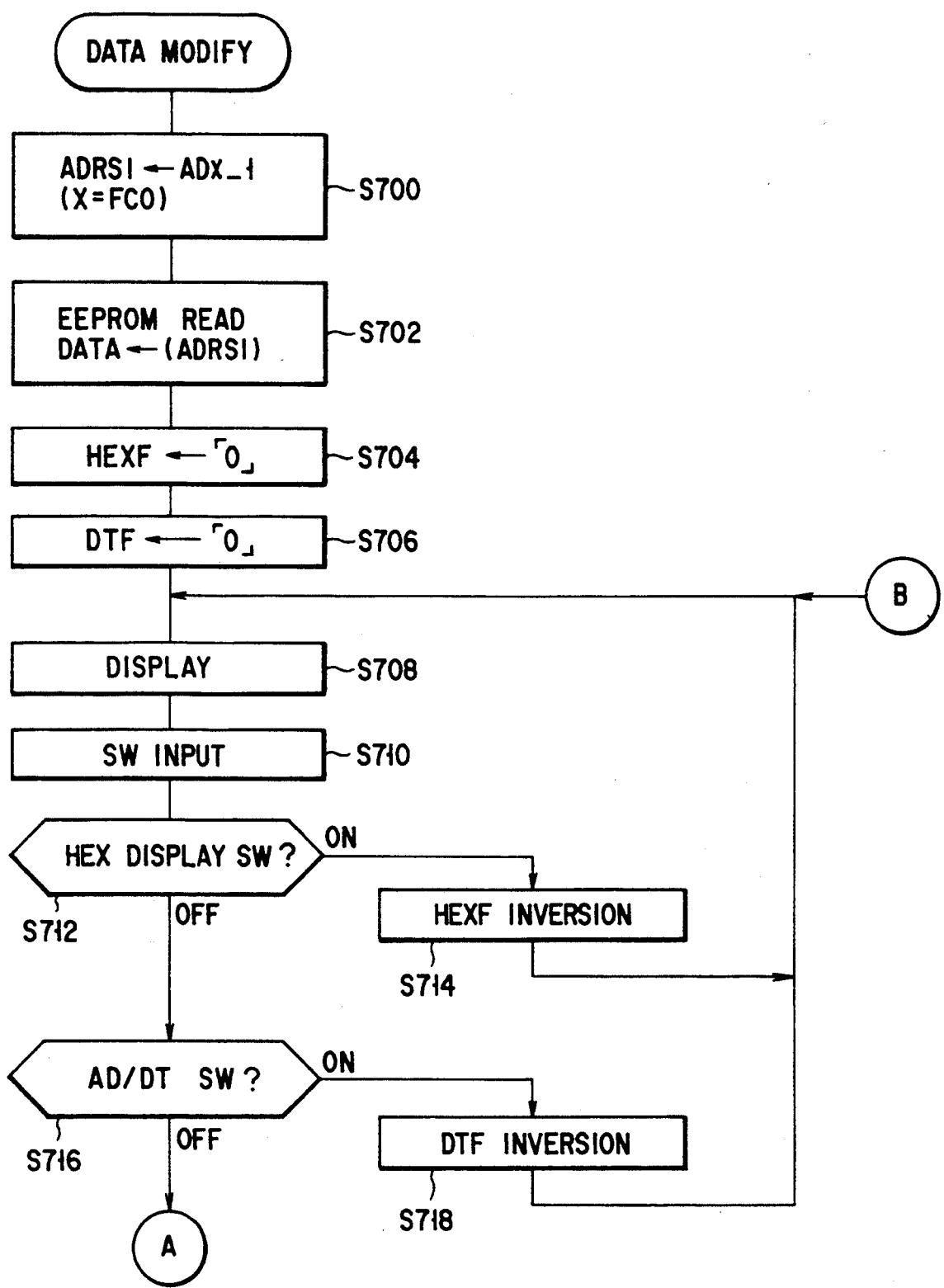
FIGS. 28A and 28B are a series of operation flowcharts for the DATA MODIFY subroutine called in the main routine of FIG. 15.
Figure 28B:
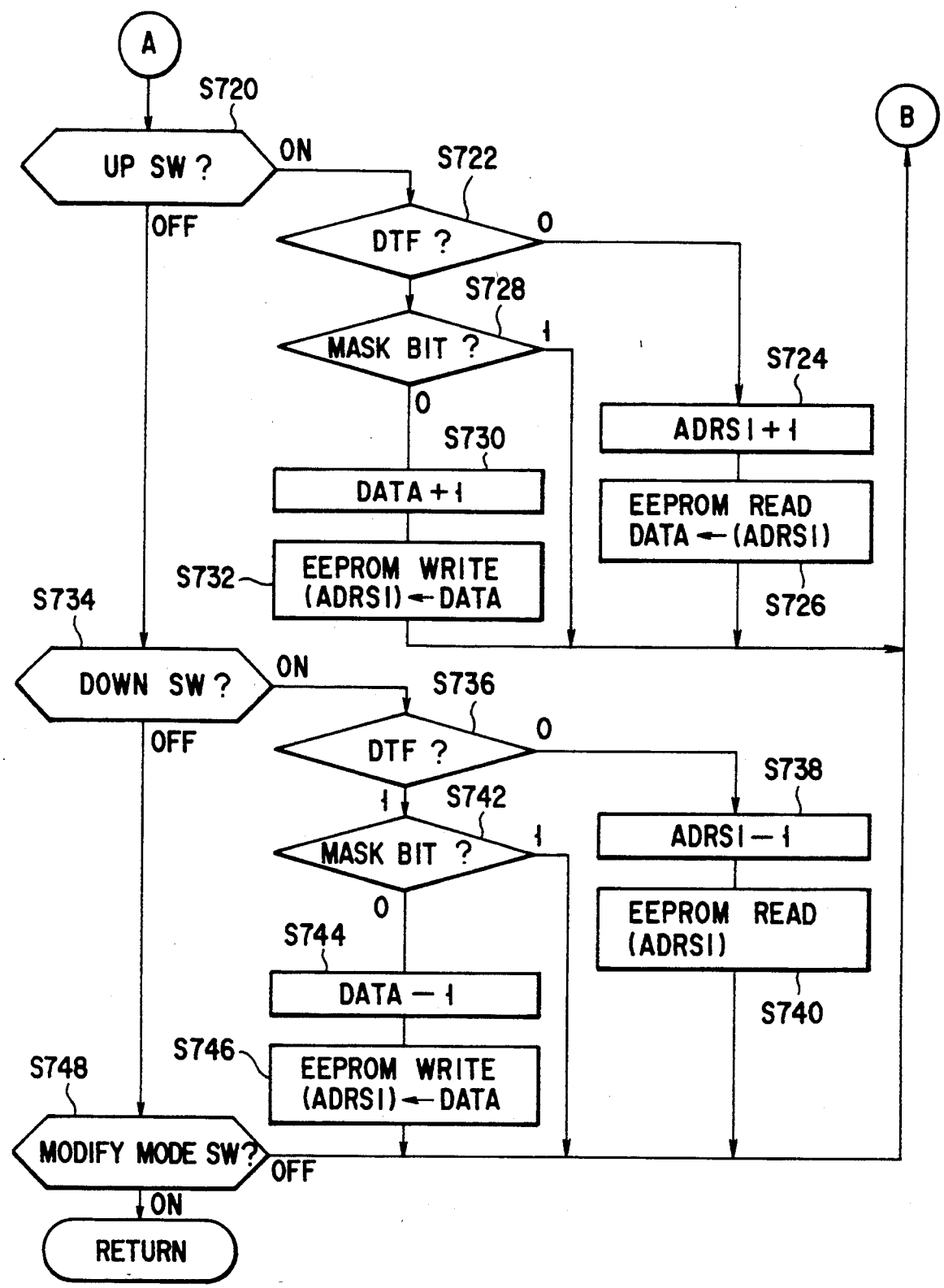

Next, referring to a series of flowcharts in FIGS. 28A and 28B, the DATA MODIFY subroutine it step S120 will be explained. This subroutine is used to display the photographic data stored in the EEPROM on the LCD and modify the data.

Specifically, in step S700, ADx_1 is set in the register ADRS1. The ADx_1, which is an address in the EEPROM, is the top address of an area in which the photographic data determined by the film counter FCO is stored.

In the following step S702, the data in the EEPROM specified by the ADRS1 is read. In step S704, the hexa-flag HEXF is cleared. The HEXF is a flag used to determine a display mode in displaying the data in the EEPROM. When this flag is cleared, the stored data is converted into characters on the basis of the character code table in FIG. 20, and then the characters are displayed. When the flag is set, the stored data is displayed in hexadecimal representation (HEX).

In the next step S706, the data select flag DTF is cleared. The DTF is used to change the function of the UP SW 66 and DOWN SW 68 operated to change addresses in the EEPROM and modify the data in the EEPROM. When the flag is cleared, the UP SW 66 and DOWN SW 68 are used to change addresses in the EEPROM. Specifically, when the UP SW 66 is in the ON state, the address is incremented; when the DOWN SW 68 is in the ON state, the address is decremented. When the flag is set, the data is modified according to the operation of the UP SW 66 and DOWN SW 68.

In the following step S708, a representation according to the SW operation is allowed to appear on the segments Seg1 through Seg17 of the LCD. The display mode will be explained later. In step S710, the state of five switches is entered: HEX display SW 62, AD/DT SW 64, UP SW 66, DOWN SW 68, and modify mode SW 60. In step S712, the state of the HEX display SW 62 is judged. When the switch 62 is in the ON state, control goes to step S714, where HEXF is inverted. Then, control proceeds to S708. Therefore, if the hexa-flag HEXF is a 1, a 0 is given (if it is a 0, then a 1 is given). This changes the data display mode.

When the HEX display SW 62 is in the OFF state, control moves from step S712 to step S716. In step S716, the state of the AD/DT SW 64 is judged. When the switch 64 is in the ON state, control goes to step S718. After the data select flag DTF has been inverted, control advances to step S708. Therefore, if the flag DTF is a 1, then a 0 is given (if it is a 0, then a 1 is given). This changes the function of the UP SW 66 and DOWN SW 68.

When the AD/DT SW 64 is in the OFF state, control moves from step S716 to step 720 to judge the state of the UP SW 66. When the switch 66 is in the ON state, control goes to step S722. In step S722, the state of the DTF is judged. When the flag is cleared, control proceeds to step S724; when the flag is set, control goes to step S728.

In step S724, the register ADRS1 is incremented. In step S726, the data in the EEPROM specified by the ADRS1 is read. Then, for display based on this data, control goes to step S708.

On the other hand, when control moves from step S722 to step S728, it is judged whether or not a mask bit is present in the data read from the EEPROM. When the mask bit is a 1, modifying data is prohibited. Therefore, nothing is done and control moves to step S708. When the mask bit is a 0, control proceeds to step S730 to increment the data read from the EEPROM. After this, in step S732, the modified data is written in the address in the EEPROM specified by the ADRS1. Then, for display based on this data, control advances to step S708.

When the UP SW 66 is in the OFF state, control moves from step S720 to step S734 to judge the state of the DOWN SW 68. When the switch 68 is in the ON state, control goes to step S736. The operations in step S736 through step S746 are basically equal to those in step S722 through step S732 except that the data increment operation is replaced with a data decrement operation.

When the DOWN SW 68 is in the OFF state, control moves from step S734 to step S748 to judge the state of the modify mode SW 60. When the switch 60 is in the OFF state, control goes to step S708. When the switch 60 is in the ON state, the data modify mode is completed. Thus, control returns.

Next explained will be given how a representation on the LCD changes by the operation of the DATA MODIFY subroutine as mentioned above.

For example, when this subroutine is called with the film counter FCO indicating 19, a representation appears as shown in FIG. 29. Specifically, EXP 19 on segments Seg1 through Seg5 means that it is the photographic data on the 19th frame. AD 1 on Seg7 through Seg10 means an address. The address shown here is not the value in the register ADRS1, but the number in FIG. 19. From this representation, the operator judges where the data item is located in the order of the photographic data on the 19th frame. DT "D" on Seg12 through Seg17 indicates the data item at number 1. This representation is obtained by converting the data in the EEPROM into characters according to the FIG. 20 character code table. ▶ on Seg 6 means that address change can be made by operating the UP SW 66 and DOWN SW 68. For example, in this state, when the UP SW 66 is operated, the address representation changes from 1 to 2, then 3, 4, ... in that order. The corresponding data representation also changes from "D" to "A", then "T", "E", ... in that order. When the operation of the UP SW 66 is continued until the display of the photographic data on the 19th frame has been completed, the number of frames on Seg4 and Seg 5 changes from 19 to 20.

In the display state in FIG. 29, when the AD/DT SW 64 is operated, the representation changes to that of FIG. 30. Specifically, Seg 6 turns off and ▶ on Seg11 turns on. This means that data modification can be made using the UP SW 66 and DOWN SW 68. For example, in this state, when the UP SW 66 is operated, the data representation changes from "D" to "E", then "F", "G", ... in that order. Interlocking with this change, the data in the EEPROM is also changed. This change is based on the character table of FIG. 20.

In the display state of FIG. 30, when the HEX display SW 62 is operated, the representation changes to that of FIG. 31. In the figure, the data is displayed in hexadecimal representation. The character D corresponds to 44 [HEX]. H on Seg16 and Seg17 indicates that display is based on hexadecimal representation.

FIG. 32 shows a representation for unchangeable data (whose mask bit is set). ☒ on Seg14 and Seg16 indicates that the data at number 21 cannot be modified. This data is the character 6.

As described in detail, with this invention, it is possible to provide a magnetic recording apparatus for a camera which is capable of checking and modifying the photographic data on the frames with which photography is already finished.

Specifically, because all of the photographic data is stored in a memory such as an EEPROM, reference and modification of the data can be made swiftly. If such data were not stored in the memory, the film would have to be moved so that the magnetic head may be positioned on the portion in which the desired photographic data is recorded and the data would have to be reproduced. In addition, to modify the reproduced data, recording would have to be done after the film is moved to a specified place. Further, after the modification, the film would have to be returned to the original exposure position. Therefore, even if one piece of data is modifiers, the film must be moved very frequently, which is unsuitable for practical use. With this invention, however, such a problem will not arise because after reference and modification to data are made on the memory, all the data in the memory is recorded in the magnetic track, interlocking with the rewinding operation. Further, the data recorded on film with which photography is already finished can be reproduced in a lump and stored in the memory. In addition, the reproduced data can be referred to and modified, and then recorded in the film again.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A camera capable of being loaded with a photosensitive film with a magnetic recording portion, comprising:
   storage means for storing data for each photographic frame;
   checking means which is constructed so as to check the contents stored in said storage means with a given timing, said checking means including reading means for reading the data stored in said storage means and display means for displaying the data read by said reading means; and
   magnetic recording means for recording the data stored in said storage means in a magnetic recording portion corresponding to each photographic frame of said film, said magnetic recording means executing recording operation at the time of the rewinding of said film.

* * * * *